US012397753B2

(12) United States Patent
Yanagida et al.

(10) Patent No.: US 12,397,753 B2
(45) Date of Patent: Aug. 26, 2025

(54) BRAKE DEVICE FOR VEHICLE

(71) Applicant: DENSO CORPORATION, Kariya (JP)

(72) Inventors: Etsugou Yanagida, Kariya (JP); Kunio Nanba, Kariya (JP); Daisuke Hokuto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/748,181

(22) Filed: Jun. 20, 2024

(65) Prior Publication Data

US 2024/0336239 A1 Oct. 10, 2024

Related U.S. Application Data

(63) Continuation of application No. 17/867,860, filed on Jul. 19, 2022, now Pat. No. 12,043,234, which is a continuation of application No. PCT/JP2021/000520, filed on Jan. 8, 2021.

(30) Foreign Application Priority Data

Jan. 21, 2020 (JP) ................. 2020-007568

(51) Int. Cl.
B60T 7/06 (2006.01)
B60T 7/04 (2006.01)
G05G 1/46 (2008.04)

(52) U.S. Cl.
CPC ............. B60T 7/06 (2013.01); B60T 7/042 (2013.01); G05G 1/46 (2013.01)

(58) Field of Classification Search
None
See application file for complete search history.

(56) References Cited

U.S. PATENT DOCUMENTS

| 6,591,710 B1 | 7/2003 | Shaw |
| 7,425,042 B2 | 9/2008 | Fujiwara |
| 2019/0129462 A1* | 5/2019 | Kim ................... G05G 1/44 |
| 2019/0366997 A1* | 12/2019 | Jeong ................ B60T 13/167 |
| 2022/0348172 A1 | 11/2022 | Yanagida et al. |

FOREIGN PATENT DOCUMENTS

| CN | 106458200 A * | 2/2017 | ............. B60T 13/74 |
| JP | 4128852 | 7/2008 | |
| JP | 2016-206291 | 12/2016 | |

* cited by examiner

Primary Examiner — Vicky A Johnson
(74) Attorney, Agent, or Firm — Nixon & Vanderhye P.C.

(57) ABSTRACT

A brake device includes: a brake pedal including a pedal and a lever that rotates about a rotation axis when the pedal is operated; a housing that rotatably supports the lever; a reaction force generator that generates a reaction force to the lever in accordance with a stroke amount of the brake pedal by receiving a force from the lever when the brake pedal is operated; a deformation member including a deformation portion that is deformed by a force received from the lever when the brake pedal is operated in a state where the reaction force generated by the reaction force generator is generated; and a stroke sensor that outputs a signal corresponding to the stroke amount and outputs a value indicating that operation of the brake pedal is abnormal and instructing execution of control for stopping a vehicle when the deformation portion is deformed.

11 Claims, 27 Drawing Sheets

BRAKE DEVICE FOR VEHICLE

CROSS REFERENCE TO RELATED APPLICATION

The present application is a continuation application of U.S. application Ser. No. 17/867,860, filed Jul. 19, 2022, which is a continuation of International Patent Application No. PCT/JP2021/000520 filed on Jan. 8, 2021, which designated the U.S. and claims the benefit of priority from Japanese Patent Application No. 2020-007568 filed on Jan. 21, 2020. The entire disclosures of all of the above applications are incorporated herein by reference.

TECHNICAL FIELD

The present disclosure relates to a brake device for a vehicle.

BACKGROUND ART

A brake device for a vehicle includes: a brake pedal including a pedal and a lever that rotates about a rotation axis when the pedal is operated; and a housing that rotatably supports the lever. A detection lever detects an abnormal rotational stroke of the pedal.

SUMMARY

According to an aspect of the present disclosure, a brake device for a vehicle includes: a brake pedal including a pedal and a lever that rotates about a rotation axis when the pedal is operated; a housing that rotatably supports the lever; a reaction force generator that generates a reaction force to the lever in accordance with a stroke amount of the brake pedal by receiving a force from the lever when the brake pedal is operated; a deformation member including a deformation portion that is deformed by a force received from the lever when the brake pedal is operated in a state where the reaction force generated by the reaction force generator is generated; and a stroke sensor that outputs a signal corresponding to the stroke amount and outputs a value indicating that operation of the brake pedal is abnormal and instructing execution of control for stopping the vehicle when the deformation portion is deformed.

DESCRIPTION OF EMBODIMENTS

Figure 1:
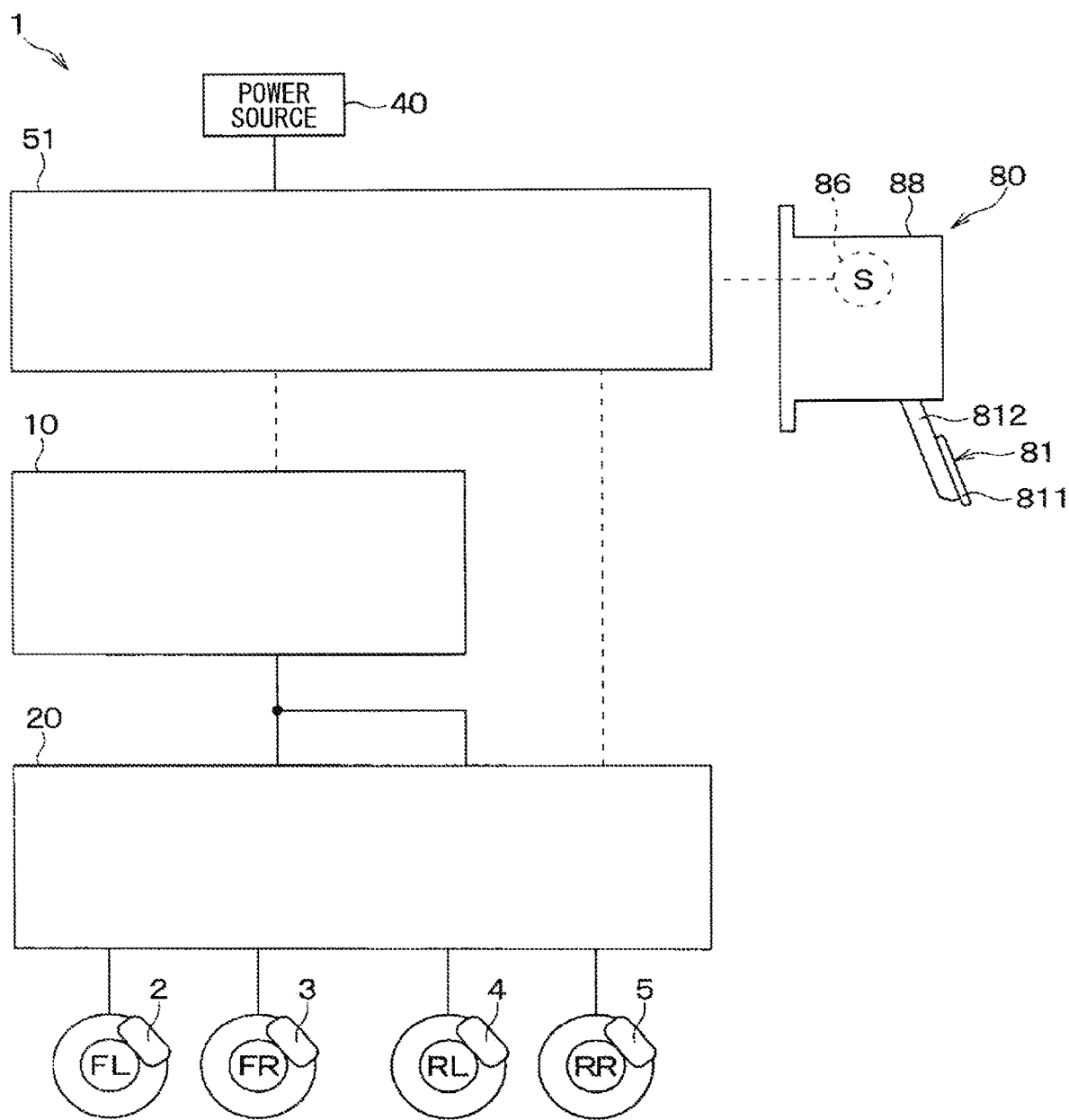
FIG. 1 is a vehicle brake system using a vehicle brake device according to a first embodiment.

To begin with, examples of relevant techniques will be described.

Conventionally, there has been known a vehicle pedal device provided with a weak point having a supporting sectional area reduced with respect to a load applied to a pedal. In the vehicle pedal device, since the weak point is formed in a detection lever of a pedal sensor integrated with the pedal, the detection lever can be relatively easily deformed with the weak point as a starting point. As a result, the detection lever detects an abnormal rotational stroke of the pedal.

According to the study of the inventors, in the vehicle pedal device, when the detection lever of the pedal sensor is deformed with the weak point as a starting point, output of the pedal sensor becomes relatively small to prevent, for example, an engine of a vehicle from being in a high output state. Here, for example, in a brake of a vehicle equipped with a brake-by-wire system, the vehicle can be stopped upon detection that a pedal is stepped on. Therefore, in the brake of the vehicle, the output of the pedal sensor needs to be relatively large such that the vehicle can stop even when the detection lever of the pedal sensor is deformed.

As a result, when the vehicle pedal device is applied to a brake of a vehicle, the output of the pedal sensor becomes relatively small when the detection lever is deformed, and it may be detected that the pedal is not stepped on. Thus, the vehicle may not be able to be stopped by the brake, and safety of the vehicle may be deteriorated.

The present application provides a brake device for a vehicle to improvie a safety of the vehicle.

According to an aspect of the present disclosure, a brake device for a vehicle includes: a brake pedal including a pedal and a lever that rotates about a rotation axis when the pedal is operated; a housing that rotatably supports the lever; a reaction force generator that generates a reaction force to the lever in accordance with a stroke amount of the brake pedal by receiving a force from the lever when the brake pedal is operated; a deformation member including a deformation portion that is deformed by a force received from the lever when the brake pedal is operated in a state where the reaction force generated by the reaction force generator is generated; and a stroke sensor that outputs a signal corresponding to the stroke amount and outputs a value indicating that operation of the brake pedal is abnormal and instructing execution of control for stopping the vehicle when the deformation portion is deformed.

Thus, the vehicle can be stopped when an operation of the brake pedal is abnormal. Accordingly, the safety of the vehicle can be improved.

The reference numerals attached to the components and the like indicate an example of correspondence between the components and the like and specific components and the like described in embodiments to be described below.

Hereinafter, embodiments will be described with reference to the drawings. In the following embodiments, the same or equivalent portions are denoted by the same reference signs, and the description thereof will be omitted.

First Embodiment

A vehicle brake device 80 is used in a vehicle brake system 1 that controls a front left wheel FL, a front right wheel FR, a rear left wheel RL, and a rear right wheel RR, which are wheels of a vehicle 6. First, the vehicle brake system 1 will be described.

As illustrated in FIG. 1, the vehicle brake system 1 includes a front left wheel cylinder, a front right wheel cylinder, a rear left wheel cylinder, and a rear right wheel cylinder. The vehicle brake system 1 includes a first actuator 10, a second actuator 20, a power supply 40, an ECU 53, and the vehicle brake device 80. Hereinafter, the wheel cylinder is referred to as W/C for convenience. The ECU is an abbreviation for electronic control unit.

A front left W/C 2 is disposed on the front left wheel FL. A front right W/C 3 is disposed on the front right wheel FR. A rear left W/C 4 is disposed on the rear left wheel RL. A rear right W/C 5 is disposed on the rear right wheel RR. The front left W/C 2, the front right W/C 3, the rear left W/C 4, and the rear right W/C 5 are connected to brake pads (not illustrated) of the vehicle 6.

The first actuator 10 includes, for example, a reservoir, a pump, a motor, a pressure sensor, and the like (not illustrated) and generates brake fluid pressure. The first actuator 10 increases the generated brake fluid pressure. Brake fluid with the increased brake fluid pressure flows to the second actuator 20 described later.

The second actuator 20 includes, for example, a differential pressure control valve, a pressure increasing control valve, a pressure reducing control valve, a pump, a motor, a pressure sensor, and the like (not illustrated) and generates brake fluid pressure. The second actuator 20 causes the brake fluid flowing from the first actuator 10 to flow to each of the front left W/C 2, the front right W/C 3, the rear left W/C 4, and the rear right W/C 5.

The power supply 40 supplies power to the ECU 53.

The ECU 53 mainly includes a microcomputer and the like and includes a CPU, a ROM, a RAM, a flash memory, an I/O, a bus line connecting these components, and the like. The ECU 53 controls the first actuator 10 and the second actuator 20 by executing a program stored in the ROM. Details of the control of the first actuator 10 and the second actuator 20 will be described later. The ROM, the RAM, and the flash memory are non-transitory tangible storage media.

Figure 2:
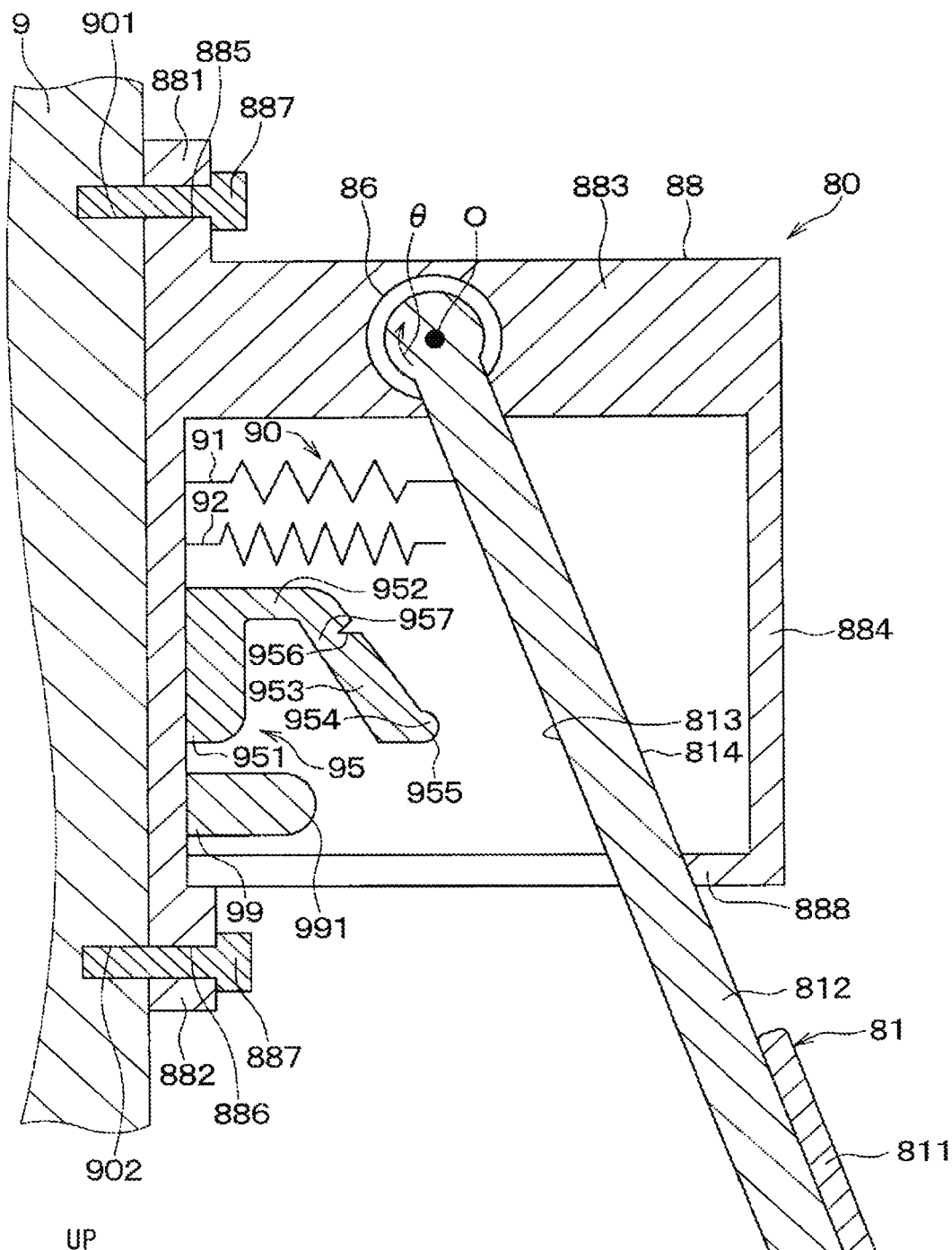
FIG. 2 is a sectional view of the vehicle brake device.

As illustrated in FIG. 2, the vehicle brake device 80 includes a brake pedal 81, a stroke sensor 86, a housing 88, a reaction force generator 90, a deformation member 95, and a stopper 99.

The brake pedal 81 is operated by being stepped on by a driver of the vehicle 6. Specifically, the brake pedal 81 includes a pedal 811 and a lever 812.

The pedal 811 is stepped on by the driver of the vehicle 6.

The lever 812 is connected to the pedal 811, and rotates about a rotation axis O when the pedal 811 is stepped on by the driver of the vehicle 6.

The stroke sensor 86 is disposed, for example, on the rotation axis O of the lever 812. As illustrated in FIG. 1, the stroke sensor 86 outputs, to the ECU 53, a signal corresponding to a stroke amount X which is an operation amount of the brake pedal 81 by a pedal effort of the driver of the vehicle 6. Here, the stroke amount X is, for example, a translational movement amount of the pedal 811 toward the front of the vehicle 6 as illustrated in FIG. 2. The stroke amount X and a sensor output Vs of the stroke sensor 86 are adjusted to have a linear relationship. Here, as the stroke amount X increases, the sensor output Vs of the stroke sensor 86 increases. Note that, here, the sensor output Vs is represented by, for example, a voltage. The stroke sensor 86 may output a signal corresponding to a rotation angle $\theta$ about the rotation axis O of the lever 812 to the ECU 53. In this case, the rotation angle $\theta$ and the signal of the stroke sensor 86 are adjusted to have a linear relationship, similarly to the relationship between the stroke amount X and the sensor output Vs.

Figure 3:
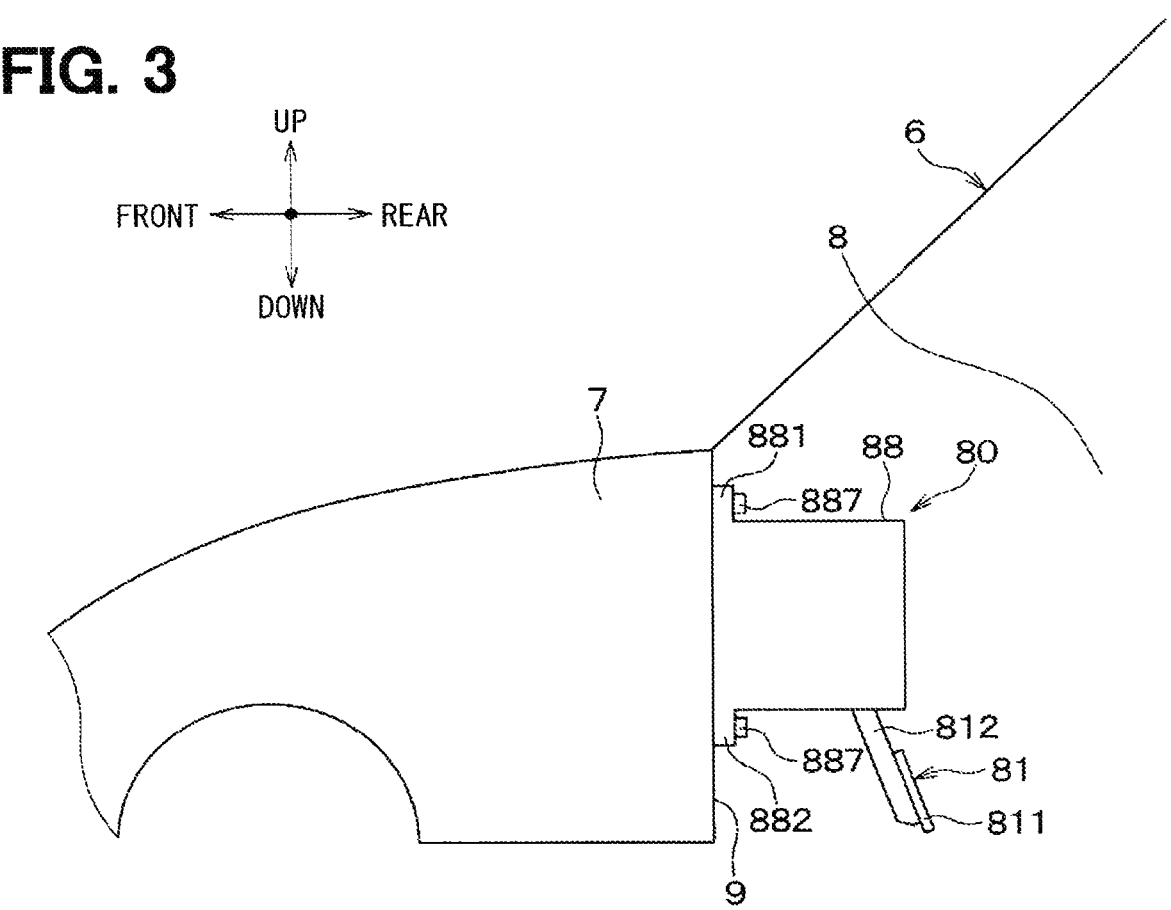
FIG. 3 is a diagram of a vehicle brake device attached to a vehicle.

As illustrated in FIGS. 2 and 3, the housing 88 is attached to a dash panel 9 which is a partition wall that separates a vehicle interior 8 from a vehicle exterior 7 of the engine room or the like of the vehicle 6. The dash panel 9 may be referred to as a bulkhead. In the vehicle exterior 7, not only an engine of the vehicle 6 but also a battery, an air conditioner, and the like of the vehicle 6 are disposed.

As illustrated in FIG. 2, the housing 88 has a bottomed cylindrical shape, and includes a first attachment portion 881, a second attachment portion 882, a bolt 887, a housing bottom 883, a housing cylindrical portion 884, and a housing extension 888. Here, for convenience of description, an upper side with respect to the front of the vehicle 6 will be simply referred to as an upper side. A lower side with respect to the front of the vehicle 6 is simply referred to as a lower side.

The first attachment portion 881 is connected to the housing bottom 883 described later and extends upward from the housing bottom 883. The first attachment portion 881 includes a first attachment hole 885. By inserting the bolt 887 into the first attachment hole 885 and a first hole 901 of the dash panel 9, the first attachment portion 881 is attached to the dash panel 9. Here, the bolt 887 is inserted so as not to penetrate the dash panel 9.

The second attachment portion 882 is connected to a front side of the housing cylindrical portion 884 described later and extends downward from the housing cylindrical portion 884. The second attachment portion 882 includes a second attachment hole 886. By inserting the bolt 887 into the second attachment hole 886 and a second hole 902 of the dash panel 9, the second attachment portion 882 is attached to the dash panel 9.

The housing bottom 883 supports a part of the lever 812 such that the lever 812 is rotatable about the rotation axis O, and the housing bottom 883 supports the stroke sensor 86.

The housing cylindrical portion 884 has a cylindrical shape, is connected to the housing bottom 883, and extends downward from the housing bottom 883. The housing cylindrical portion 884 houses a part of the lever 812.

The housing extension 888 is connected to a rear side of the housing cylindrical portion 884. The housing extension 888 extends from the rear side of the housing cylindrical portion 884 toward a lever rear surface 814, here, from the rear side toward the front side of the housing cylindrical portion 884. Therefore, the housing extension 888 is in contact with the lever rear surface 814 in an initial state. Thus, the housing extension 888 supports the lever 812 such that the lever 812 does not rotate toward the rear side in the initial state. The lever rear surface 814 is a rear surface of the lever 812 and is located on a side of the lever 812 on which the pedal 811 is located.

The reaction force generator 90 generates a reaction force Fr to the lever 812 in accordance with the stroke amount X. Specifically, the reaction force generator 90 includes a first elastic member 91 and a second elastic member 92.

The first elastic member 91 is, for example, a compression coil spring. The first elastic member 91 is connected to the front side of the housing cylindrical portion 884 and a lever front surface 813. The lever front surface 813 is located on a front surface of the lever 812 and on a side of the lever 812 opposite to the pedal 811.

The second elastic member 92 is, for example, a compression coil spring. One end of the second elastic member 92 is connected to the front side of the housing cylindrical portion 884. The other end of the second elastic member 92 is not connected to the lever 812 and faces the lever front surface 813 in the initial state. Therefore, the other end of the second elastic member 92 is not in contact with the lever front surface 813 in the initial state. The second elastic member 92 is disposed in parallel with the first elastic member 91. Here, an elastic modulus of the second elastic member 92 is greater than an elastic modulus of the first elastic member 91.

The deformation member 95 is separated from the housing 88 and is disposed on the front side of the housing cylindrical portion 884. The deformation member 95 may be integrated with the housing 88.

Figure 4:
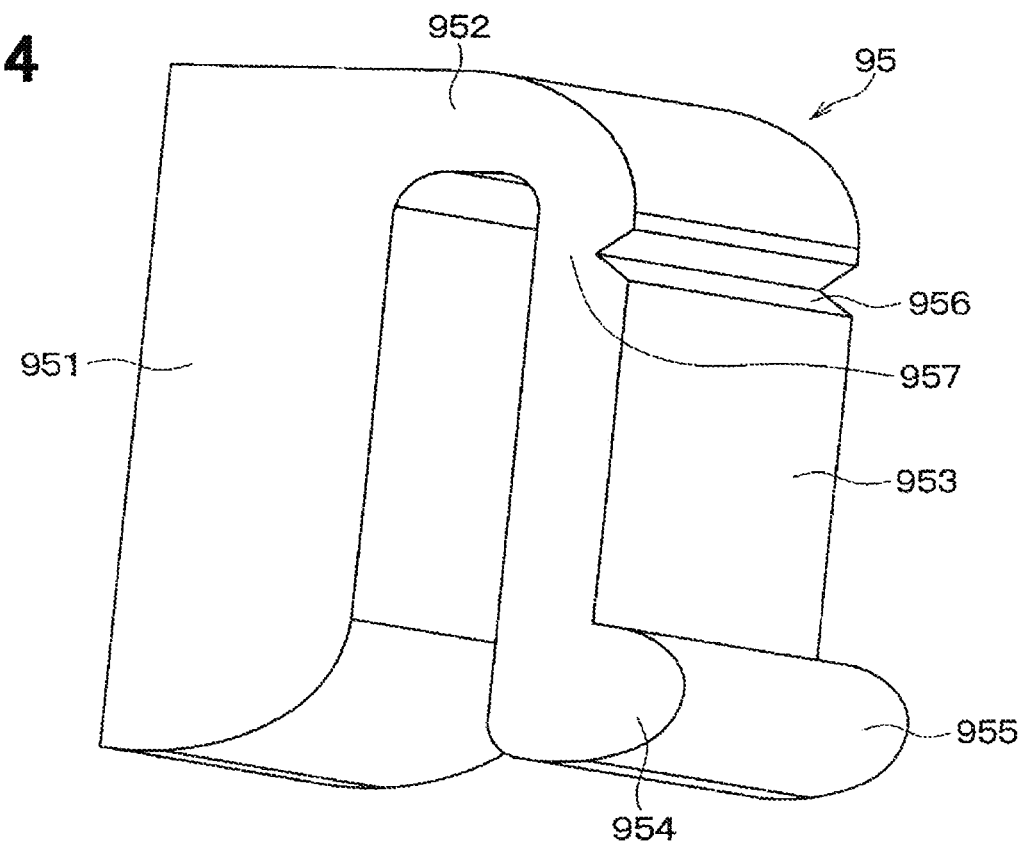
FIG. 4 is a perspective view of a deformation member of the vehicle brake device.

Specifically, as illustrated in FIGS. 2 and 4, the deformation member 95 includes a base 951, an extension 952, and a deformation portion 953.

The base 951 is connected to the front side of the housing cylindrical portion 884 by welding, depositing, adhesion, or the like, and extends in an up-down direction. Note that the base 951 and the housing cylindrical portion 884 may be connected by inserting screws or the like into holes (not illustrated) of the base 951 and the housing cylindrical portion 884.

The extension 952 is connected to the upper side of the base 951 and an upper side of a deformation portion 953 described later, and extends in a front-rear direction. The extension 952 forms a space between the lower side of the base 951 and the lower side of the deformation portion 953. Here, in the initial state, a distance in the front-rear direction from the base 951 to the deformation portion 953 in the space between the base 951 and the deformation portion 953 increases from the rotation axis O toward the pedal 811, here, from the upper side to the lower side.

The deformation portion 953 is connected to the rear side of the extension 952 and extends in the up-down direction and in a direction from the extension 952 toward the lever front surface 813. The deformation portion 953 includes a contact 954, a recess 956, and an easily deformable portion 957.

The contact 954 is connected to the lower side of the deformation portion 953 and protrudes toward the lever front surface 813, here, rearward. The contact 954 also includes a contact surface 955. The contact surface 955 faces the lever front surface 813. The contact surface 955 is not in contact with the lever front surface 813 in the initial state. A distance in the front-rear direction from the contact surface 955 to the lever front surface 813 in the initial state is longer than a distance in the front-rear direction from the other end of the second elastic member 92 to the lever front surface 813 in the initial state. The contact surface 955 is curved convexly toward the lever front surface 813 by being curved in a shape of a side surface of a semicircular column. The contact surface 955 may be curved convexly toward the lever front surface 813 by being curved in a hemispherical shape.

The recess 956 is formed on the upper side of the deformation portion 953. The recess 956 is, for example, a notch and is a V-shaped groove.

The easily deformable portion 957 is adjacent to the recess 956 in a depth direction of the recess 956. Due to the recess 956, a cross section in the depth direction of the recess 956 in the easily deformable portion 957 is smallest in cross sections in the depth direction of the recess 956 in the deformation portion 953. Thus, when a force is applied to the deformation portion 953, a stress applied to the easily deformable portion 957 is the greatest among stresses applied to the deformation portion 953. Accordingly, the easily deformable portion 957 is most easily deformed in the deformation portion 953. Therefore, the easily deformable portion 957 is likely to serve as a starting point when the deformation portion 953 is deformed.

As will be described later, the stopper 99 stops the rotation of the lever 812 when the pedal 811 is abnormally operated. Specifically, as illustrated in FIG. 2, the stopper 99 is connected to the front side of the housing cylindrical portion 884. The stopper 99 protrudes from the front side of the housing cylindrical portion 884 toward the lever front surface 813, here, from the front side toward the rear side of the housing cylindrical portion 884. An elastic modulus of the stopper 99 is significantly great, and is greater than the elastic modulus of the first elastic member 91, the elastic modulus of the second elastic member 92, and an elastic modulus of the deformation member 95. Therefore, the stopper 99 is hardly deformed by the force received from the lever 812. The stopper 99 includes a stopper surface 991. The stopper surface 991 faces the lever front surface 813. The stopper surface 991 is not in contact with the lever front surface 813 in the initial state. A distance in the front-rear direction from the stopper surface 991 to the lever front surface 813 in the initial state is longer than a distance in the front-rear direction from the contact surface 955 to the lever front surface 813 in the initial state. The stopper surface 991 is curved convexly toward the lever front surface 813 by being curved in a shape of a side surface of a semicircular column. The stopper surface 991 may be curved convexly toward the lever front surface 813 by being curved in a hemispherical shape.

The vehicle brake system 1 is configured as described above. In the vehicle brake system 1, the vehicle brake device 80 improves safety of the vehicle 6. In order to describe this improvement in safety, operation of the vehicle brake device 80 will be described with reference to a chart illustrating a relationship between the stroke amount X, the reaction force Fr, and the sensor output Vs in FIG. 5 and to FIGS. 2 and 6 to 11.

Figure 5:
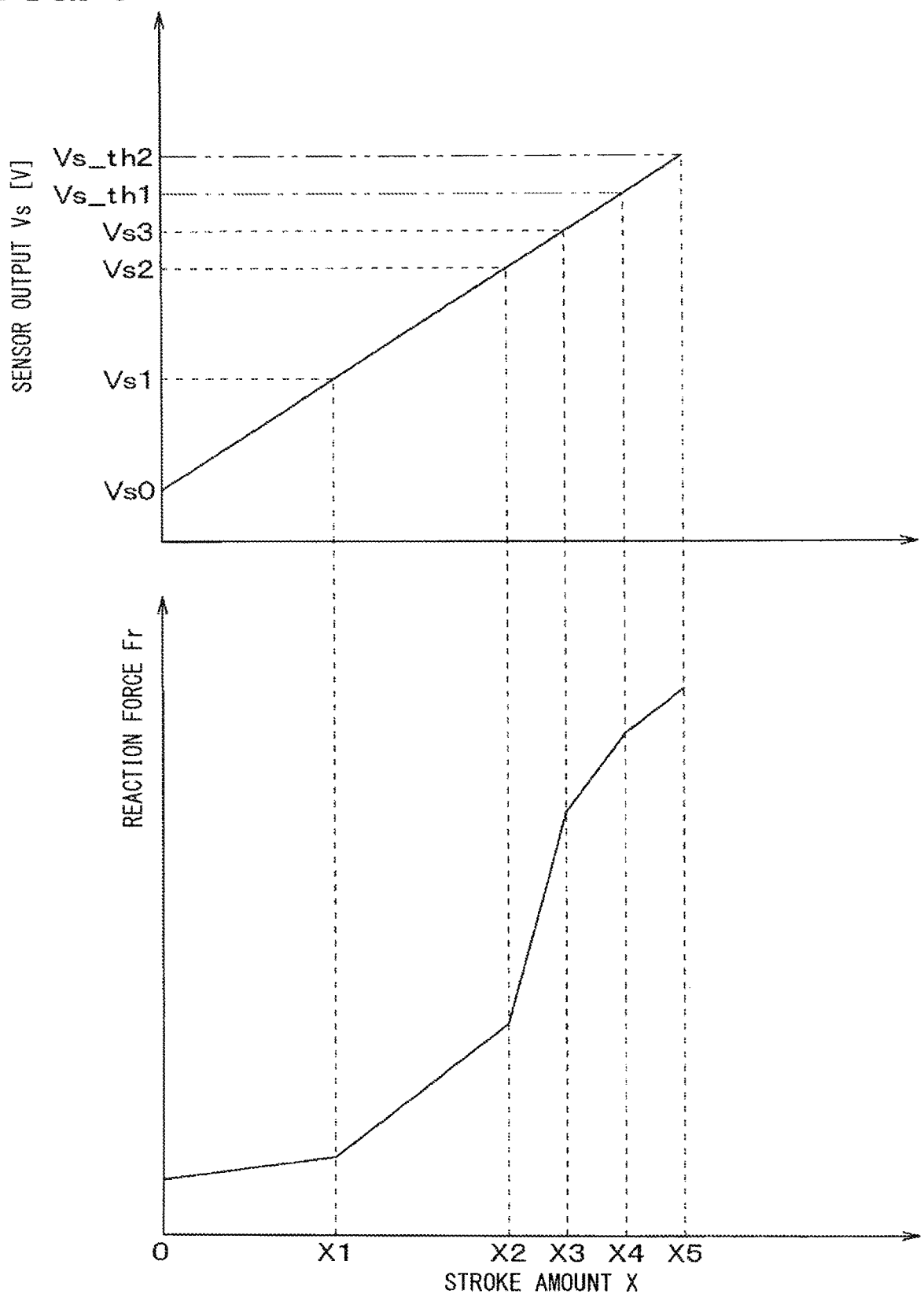
FIG. 5 is a chart illustrating a relationship between a stroke amount, a reaction force, and a sensor output.

As shown in FIG. 2, before the brake pedal 81 is operated and in the initial state where the stroke amount X is 0, the lever 812 is biased by the first elastic member 91. As a result, the housing extension 888 and the lever rear surface 814 come into contact with each other. At this time, the housing extension 888 supports the lever 812. Therefore, the lever 812 does not rotate in the initial state. At this time, as illustrated in FIG. 5, the sensor output Vs of the stroke sensor 86 is Vs0 which is a value in the initial state.

The brake pedal 81 is operated by the pedal effort of the driver of the vehicle 6, and the stroke amount X becomes greater than 0 and less than X1. At this time, since the stroke amount X and the sensor output Vs of the stroke sensor 86 have a linear relationship, the sensor output Vs increases as the stroke amount X increases.

Figure 6:
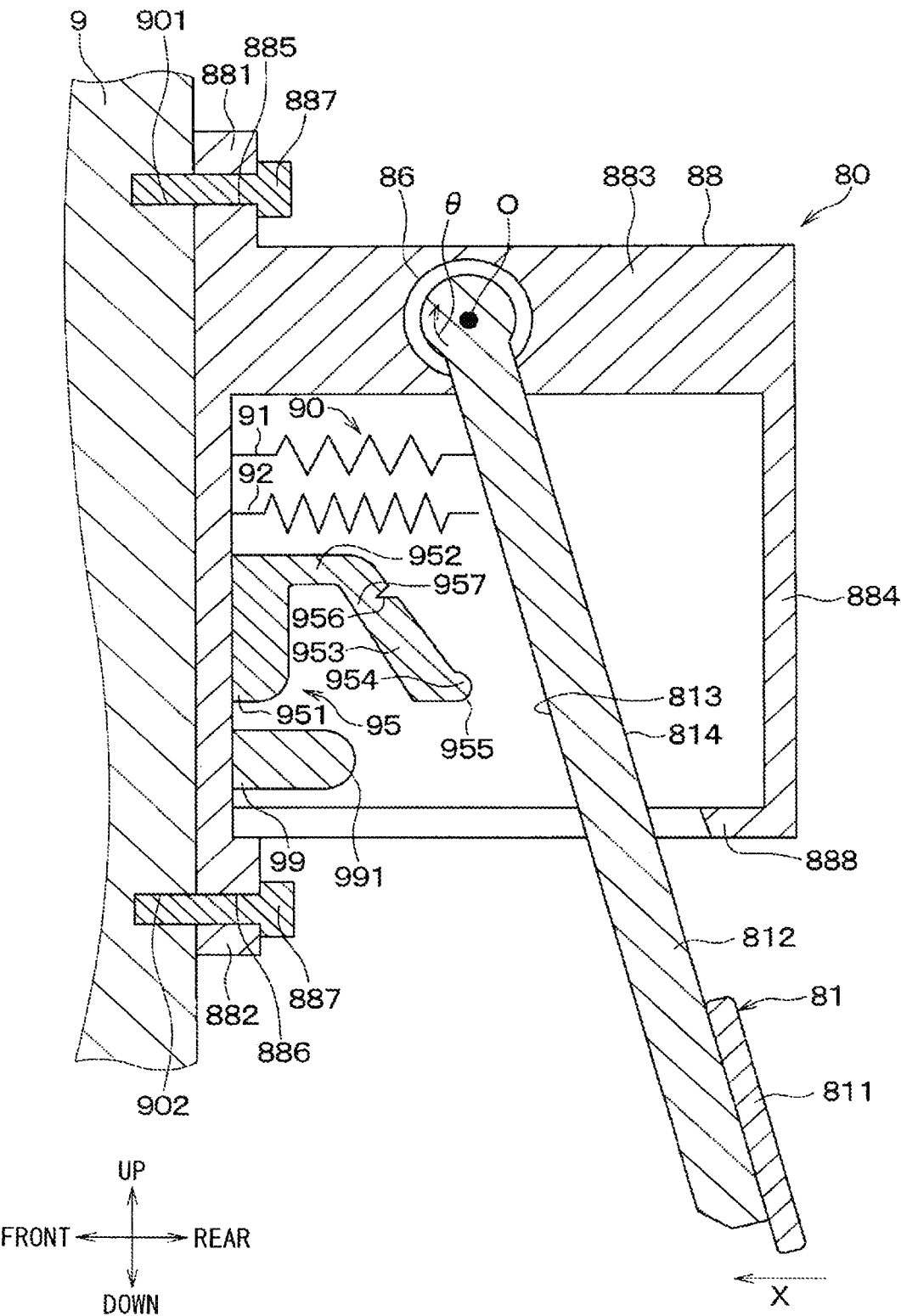
FIG. 6 is a sectional view of the vehicle brake device.

At this time, as illustrated in FIG. 6, a force corresponding to the pedal effort of the driver of the vehicle 6 is transmitted from the lever 812 to the first elastic member 91. As a result, the lever 812 is separated from the housing extension 888. The first elastic member 91 receives a force from the lever 812. Therefore, the first elastic member 91 is compressed, and a restoring force of the first elastic member 91 is generated.

At this time, the reaction force Fr to the lever 812 is generated by the restoring force of the first elastic member 91.

The restoring force of the first elastic member 91 is proportional to a deformation amount of the first elastic member 91. The deformation amount of the first elastic member 91 is proportional to the stroke amount X. Accordingly, the restoring force of the first elastic member 91 is proportional to the stroke amount X. Thus, the stroke amount X and the reaction force Fr by the first elastic member 91 have a linear relationship.

Therefore, when the stroke amount X is greater than 0 and less than X1, as illustrated in FIG. 5, the reaction force Fr increases as the stroke amount X increases.

When the stroke amount X is X1, the sensor output Vs is Vs1. At this time, the lever front surface 813 and the other end of the second elastic member 92 come into contact with each other. Note that X1 is set by a distance in the front-rear direction from the other end of the second elastic member 92 to the lever front surface 813 in the initial state, and the like.

The brake pedal 81 is operated by the pedal effort of the driver of the vehicle 6, and the stroke amount X becomes greater than or equal to X1 and less than X2. At this time, since the stroke amount X and the sensor output Vs of the stroke sensor 86 have a linear relationship, the sensor output Vs increases as the stroke amount X increases.

Figure 7:
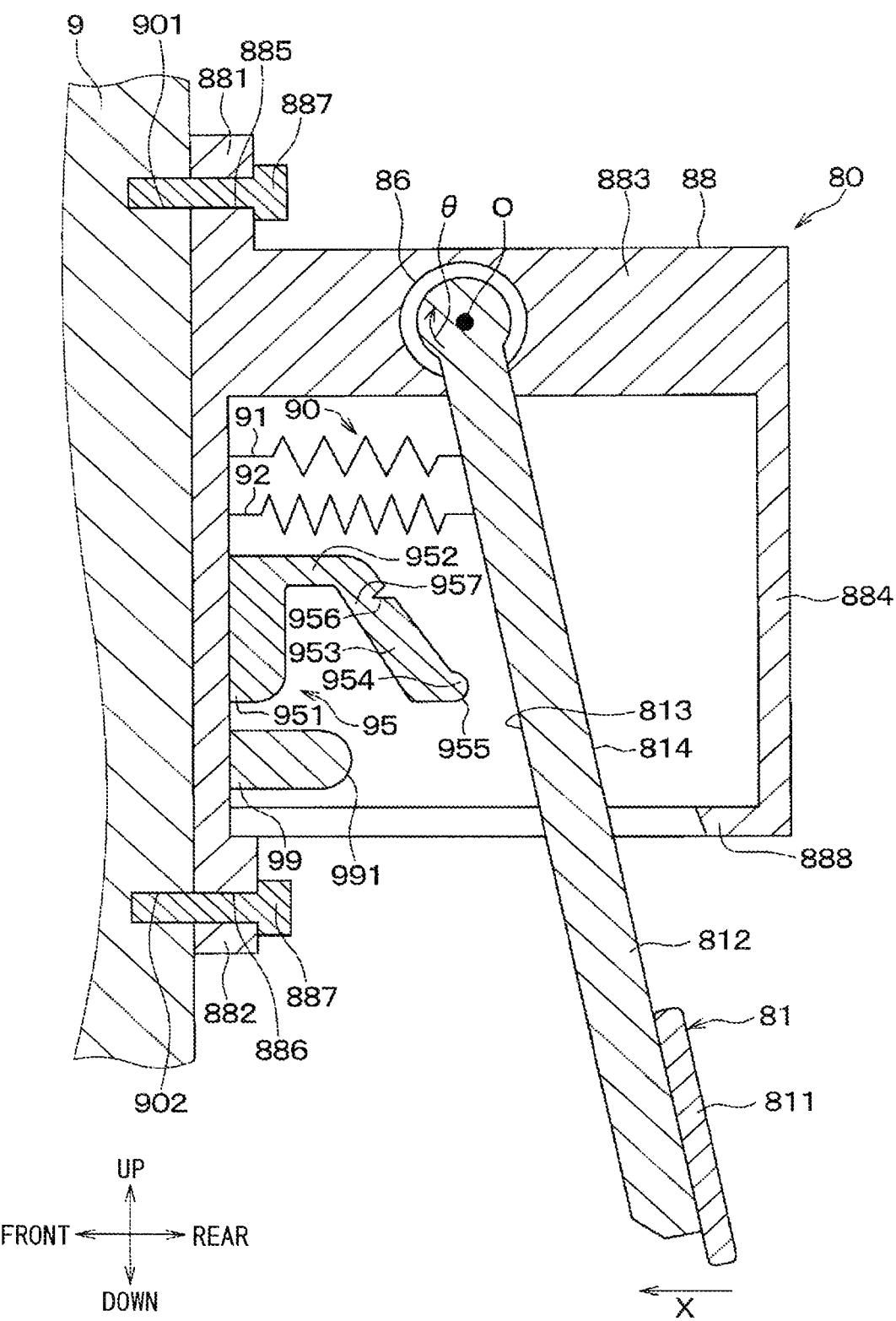
FIG. 7 is a sectional view of the vehicle brake device.

At this time, as illustrated in FIG. 7, the force corresponding to the pedal effort of the driver of the vehicle 6 is transmitted from the lever 812 to the first elastic member 91 and the second elastic member 92. Accordingly, since the first elastic member 91 and the second elastic member 92 are compressed, a restoring force of the first elastic member 91 and the second elastic member 92 is generated.

At this time, the reaction force Fr to the lever 812 is generated by the restoring force of the first elastic member 91 and the restoring force of the second elastic member 92.

Thus, as described above, the stroke amount X and the reaction force Fr by the first elastic member 91 have a linear relationship. The restoring force of the second elastic member 92 is proportional to a deformation amount of the second elastic member 92, similarly to the first elastic member 91. The deformation amount of the second elastic member 92 is proportional to the stroke amount X. Accordingly, the restoring force of the second elastic member 92 is proportional to the stroke amount X. Thus, the stroke amount X and the reaction force Fr by the second elastic member 92 have a linear relationship. Therefore, the reaction force Fr to the lever 812 at this time is a superposition of the reaction force Fr by the first elastic member 91 and the reaction force Fr by the second elastic member 92, and thus has a linear relationship.

When the stroke amount X is greater than or equal to X1 and less than X2, as illustrated in FIG. 4, the reaction force Fr to the lever 812 increases as the stroke amount X increases. Here, the elastic modulus of the second elastic member 92 is greater than the elastic modulus of the first elastic member 91. Thus, an amount of change in the reaction force Fr with respect to the stroke amount X when the stroke amount X is greater than or equal to X1 and less than X2 is relatively great. As a result, the force corresponding to a braking force of the vehicle 6 easily acts on the driver of the vehicle 6, and it is easy to drive the vehicle 6.

When the stroke amount X is X2, the sensor output Vs is Vs2. At this time, the lever 812 and the deformation portion 953 come into contact with each other. Specifically, the lever front surface 813 and the contact surface 955 of the deformation portion 953 come into contact with each other. Here, since the contact surface 955 has a shape of a side surface of a semicircular column and is curved convexly toward the lever front surface 813, the lever 812 and the deformation portion 953 come into line contact with each other. Here, in the initial state, the distance in the front-rear direction from the base 951 to the deformation portion 953 in the space between the base 951 and the deformation portion 953 increases from the upper side to the lower side. Thus, when the lever 812 and the deformation portion 953 come into contact with each other, the lever 812 of the brake pedal 81 and the extension 952 do not interfere with each other. Note that X2 is set by a distance in the front-rear direction from the contact surface 955 of the deformation portion 953 to the lever front surface 813 in the initial state, and the like. Here, the distance in the front-rear direction from the contact surface 955 to the lever front surface 813 in the initial state is longer than the distance in the front-rear direction from the other end of the second elastic member 92 to the lever front surface 813, and thus X2 is greater than X1. Here, an operation range of the brake pedal 81 when the stroke amount X is less than or equal to X2 is a normal use range of the brake pedal 81. As described below, the operation range of the brake pedal 81 when the stroke amount X is greater than X2 is a range for overload detection.

The brake pedal 81 is operated by the pedal effort of the driver of the vehicle 6, and the stroke amount X becomes greater than X2 and less than X3. At this time, since the stroke amount X and the sensor output Vs of the stroke sensor 86 have a linear relationship, the sensor output Vs increases as the stroke amount X increases.

Figure 8:
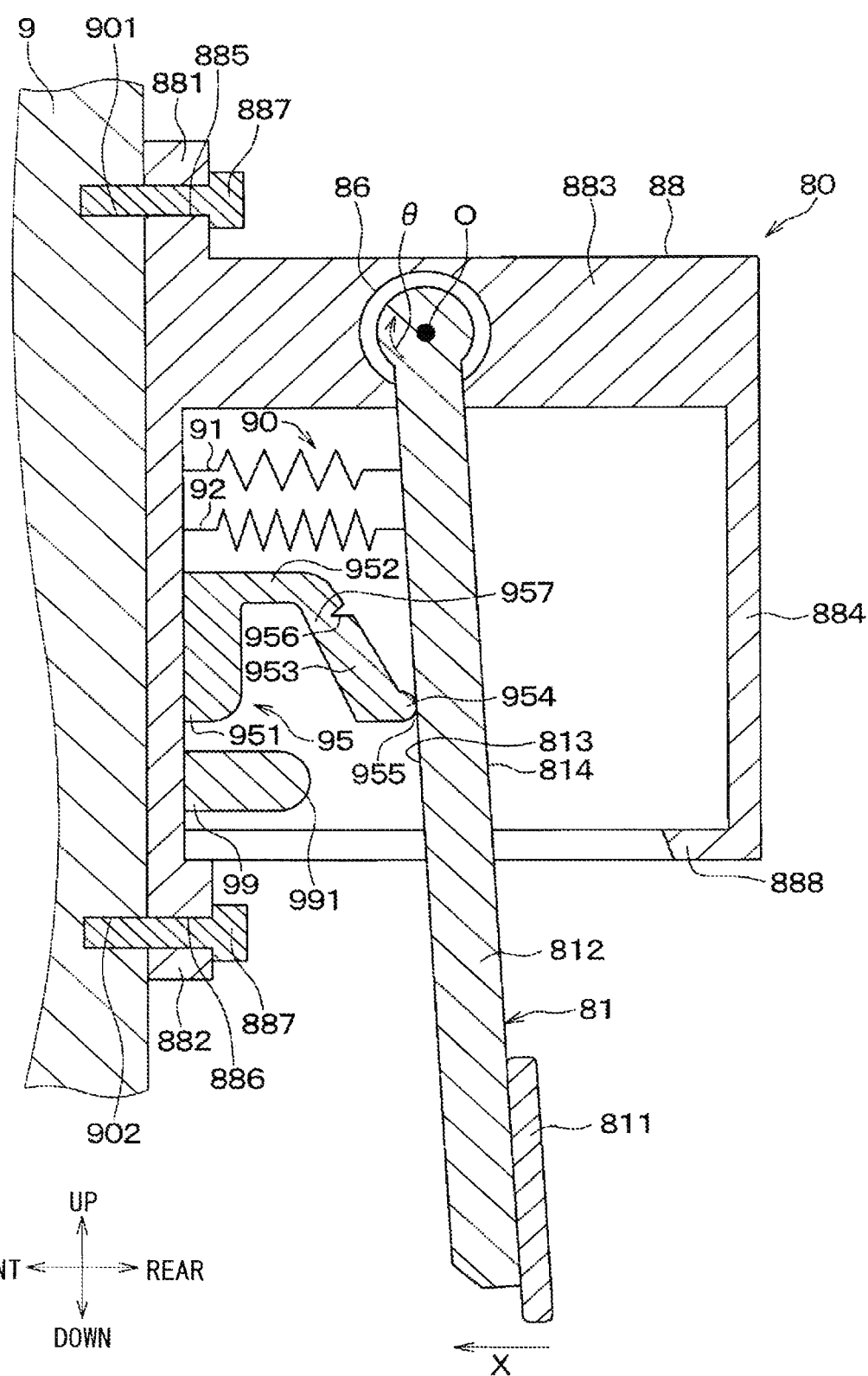
FIG. 8 is a sectional view of the vehicle brake device.

At this time, as illustrated in FIG. 8, similarly to the above, the force corresponding to the pedal effort of the driver of the vehicle 6 is transmitted from the lever 812 to the first elastic member 91 and the second elastic member 92. Thus, the reaction force Fr to the lever 812 is generated by the restoring force of the first elastic member 91 and the second elastic member 92.

At this time, the force corresponding to the pedal effort of the driver of the vehicle 6 is transmitted from the lever 812 to the deformation portion 953. As a result, the deformation portion 953 is elastically deformed. Here, since the deformation of the deformation portion 953 is elastic deformation, when the driver of the vehicle 6 stops stepping on the pedal 811, a shape of the deformation portion 953 returns to a shape in the initial state.

Here, as described above, the easily deformable portion 957 of the deformation portion 953 is most easily deformed in the deformation portion 953. Therefore, when receiving the force from the lever 812, the deformation portion 953 is deflected with the easily deformable portion 957 as a starting point. Here, the extension 952 forms a space between the lower side of the base 951 and the lower side of the deformation portion 953. Therefore, here, the deformation portion 953 deflects the space to be small with the easily deformable portion 957 as a starting point. Since the deformation portion 953 is elastically deformed, a restoring force of the deformation portion 953 is generated. The reaction force Fr to the lever 812 is generated by the restoring force of the deformation portion 953.

Therefore, at this time, the reaction force Fr to the lever 812 is generated by the restoring force of the first elastic member 91, the restoring force of the second elastic member 92, and the restoring force of the deformation portion 953.

The restoring force of the deformation portion 953 is proportional to a deflection amount of the deformation portion 953. The deflection amount of the deformation portion 953 is proportional to the stroke amount X. The restoring force due to the deflection of the deformation portion 953 is proportional to the stroke amount X. Thus, the reaction force Fr by the deformation portion 953 and the stroke amount X have a linear relationship. Note that an amount of change in the reaction force Fr with respect to the stroke amount X by the deformation portion 953 at this time is set by flexural rigidity of the deformation portion 953. Here, the flexural rigidity is a multiplication value of a Young's modulus of the deformation portion 953 and a second moment of area of the deformation portion 953.

Thus, as described above, the stroke amount X and the reaction force Fr by the first elastic member 91 and the second elastic member 92 have a linear relationship. Therefore, the reaction force Fr to the lever 812 at this time is a superposition of the reaction force Fr by the first elastic member 91, the reaction force Fr by the second elastic member 92, and the reaction force Fr by the deformation portion 953, and thus has a linear relationship.

When the stroke amount X is greater than X2 and less than X3, as illustrated in FIG. 5, the reaction force Fr to the lever 812 increases as the stroke amount X increases.

When the stroke amount X is X3, the sensor output Vs is Vs3. At this time, the force transmitted from the lever 812 to the deformation portion 953 causes the deformation portion 953 to yield, that is, starts to be plastically deformed. Since X3 is the stroke amount X when the deformation portion 953 yields, X3 is set by a material, shape, and the like of the deformation portion 953. Here, the deformation member 95 includes, for example, a ductile material.

The brake pedal 81 is operated by the pedal effort of the driver of the vehicle 6, and the stroke amount X becomes greater than or equal to X3 and less than X4. At this time, since the stroke amount X and the sensor output Vs of the stroke sensor 86 have a linear relationship, the sensor output Vs increases as the stroke amount X increases.

Figure 9:
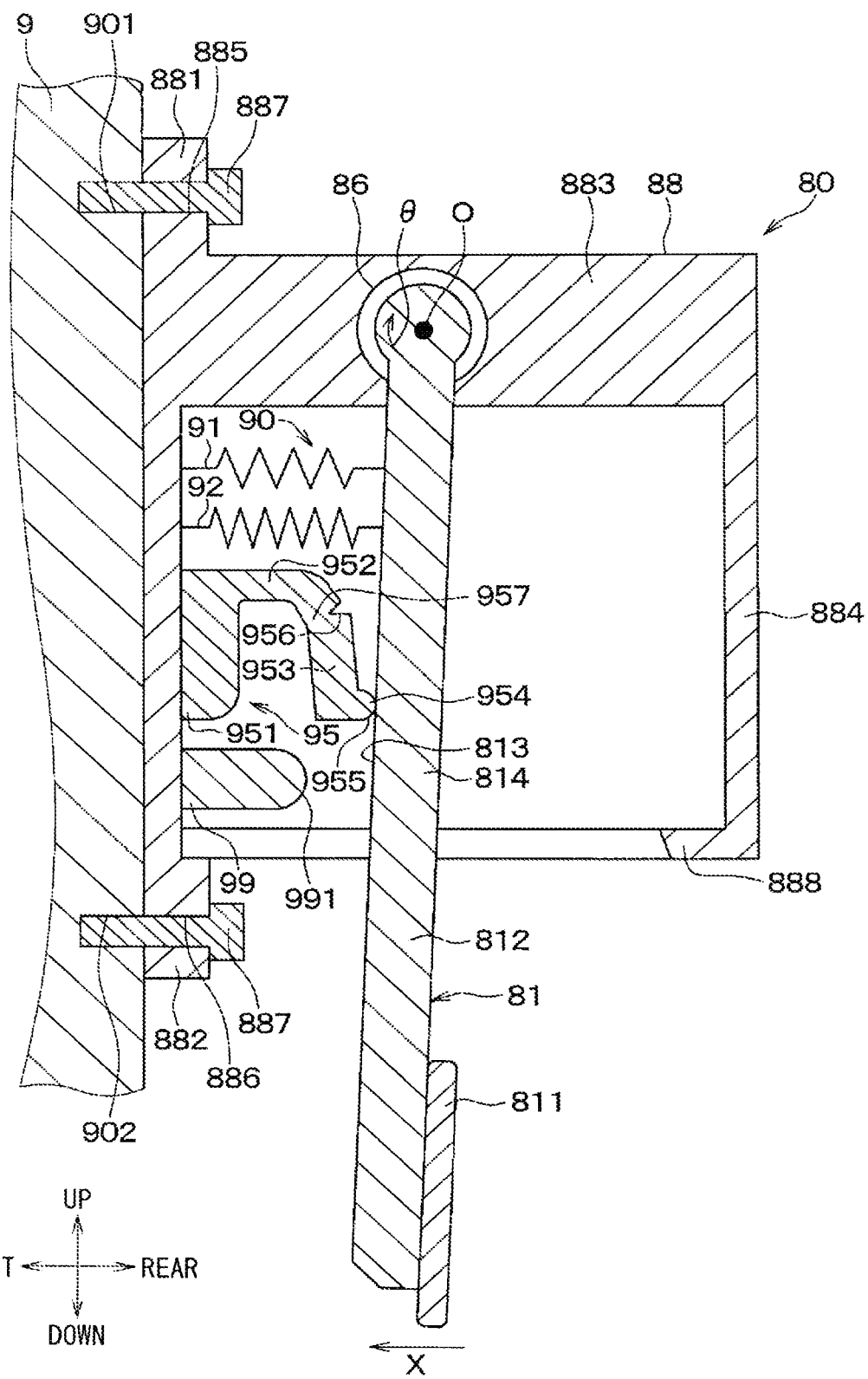
FIG. 9 is a sectional view of the vehicle brake device.

At this time, as illustrated in FIG. 9, similarly to the above, the force corresponding to the pedal effort of the driver of the vehicle 6 is transmitted from the lever 812 to the first elastic member 91 and the second elastic member 92. As a result, the reaction force Fr to the lever 812 by the first elastic member 91 and the second elastic member 92 is generated.

At this time, the force corresponding to the pedal effort of the driver of the vehicle 6 is transmitted from the lever 812 to the deformation portion 953. As a result, the deformation portion 953 is plastically deformed. Specifically, similarly to the above, the deformation portion 953 deflects with the easily deformable portion 957 a starting point. Here, since the deformation portion 953 is plastically deformed, when the driver of the vehicle 6 stops stepping on the pedal 811, the shape of the deformation portion 953 does not return to the shape in the initial state.

Here, since the deformation of the deformation portion 953 is deflection accompanied by plastic deformation, the deformation portion 953 generates the reaction force Fr to the lever 812 by a force of reaction to the force received from the lever 812.

Therefore, at this time, the reaction force Fr to the lever 812 is generated by the restoring force of the first elastic member 91, the restoring force of the second elastic member 92, and the force of reaction of the deformation portion 953 to the force received by the deformation portion 953 from the lever 812.

The force of reaction of the deformation portion 953 to the force received by the deformation portion 953 from the lever 812 is proportional to the deflection amount of the deformation portion 953. Thus, similarly to the above, the reaction force Fr by the deformation portion 953 and the stroke amount X have a linear relationship.

Thus, as described above, the stroke amount X and the reaction force Fr by the first elastic member 91 and the second elastic member 92 have a linear relationship. Therefore, the reaction force Fr to the lever 812 at this time is a superposition of the reaction force Fr by the first elastic member 91, the reaction force Fr by the second elastic member 92, and the reaction force Fr by the deformation portion 953, and thus has a linear relationship.

When the stroke amount X is greater than or equal to X3 and less than X4, as illustrated in FIG. 5, the reaction force Fr to the lever 812 increases as the stroke amount X increases.

When the stroke amount X is X4, the sensor output Vs is a first sensor predetermined value Vs_th1 described later. At this time, the force transmitted from the lever 812 to the deformation portion 953 damages the deformation portion 953. Specifically, since the easily deformable portion 957 is most easily deformed in the deformation portion 953, the easily deformable portion 957 breaks. Thus, since X4 is the stroke amount X when the deformation portion 953 is damaged, X4 is set by a material, shape, and the like of the deformation portion 953.

The brake pedal 81 is operated by the pedal effort of the driver of the vehicle 6, and the stroke amount X becomes greater than or equal to X4 and less than X5. At this time, since the stroke amount X and the sensor output Vs of the stroke sensor 86 have a linear relationship, the sensor output Vs increases as the stroke amount X increases. Therefore, the sensor output Vs at this time is greater than the first sensor predetermined value Vs_th1.

Figure 10:
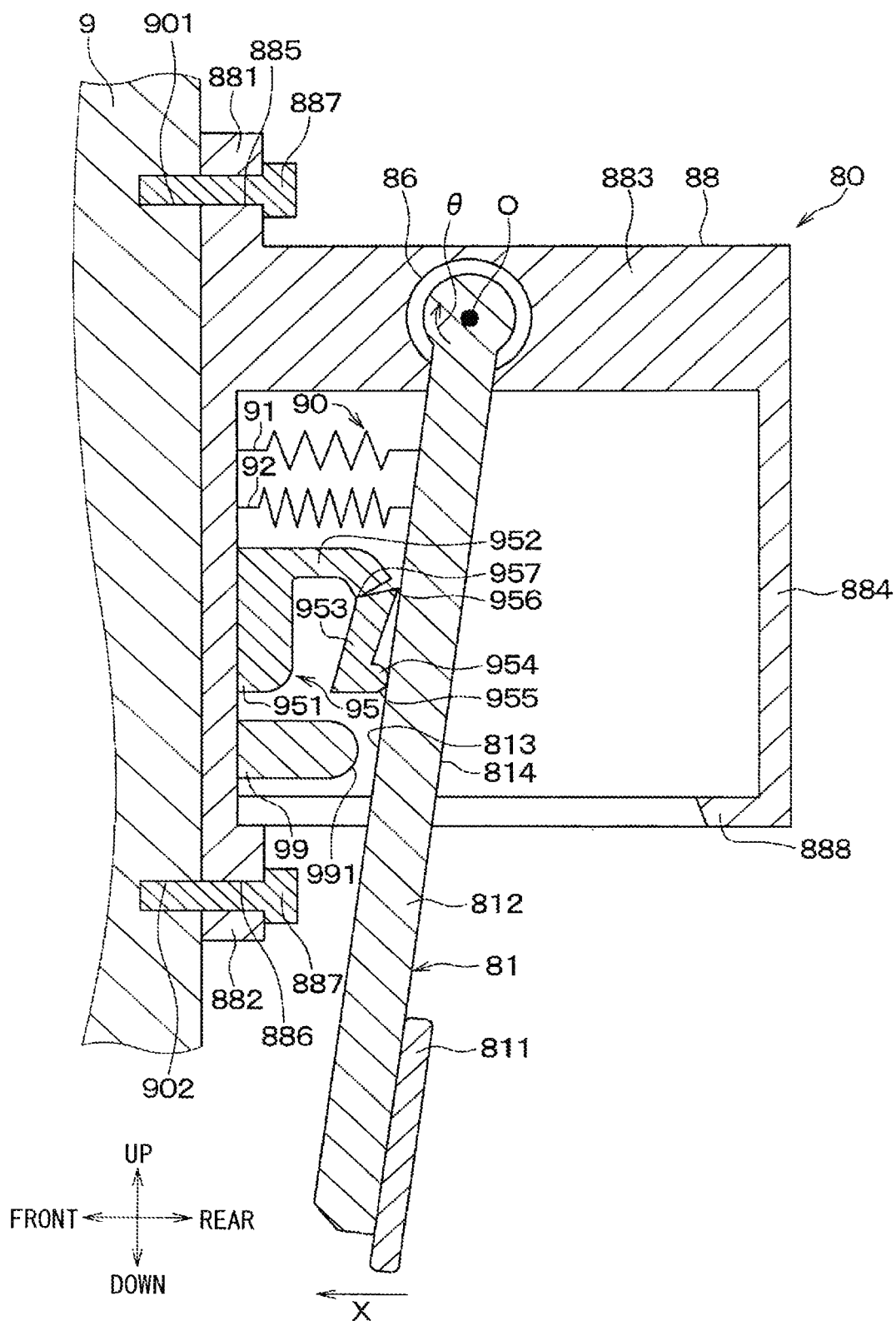
FIG. 10 is a sectional view of the vehicle brake device.

At this time, as illustrated in FIG. 10, similarly to the above, the force corresponding to the pedal effort of the driver of the vehicle 6 is transmitted from the lever 812 to the first elastic member 91 and the second elastic member 92. Thus, the reaction force Fr to the lever 812 by the first elastic member 91 and the second elastic member 92 is generated.

At this time, since the deformation portion 953 is damaged, here, the easily deformable portion 957 is broken, the reaction force Fr by the deformation portion 953 is not generated.

At this time, the reaction force Fr to the lever 812 is generated by the restoring force of the first elastic member 91 and the second elastic member 92.

Thus, as described above, the stroke amount X and the reaction force Fr by the first elastic member 91 and the second elastic member 92 have a linear relationship. Thus, the reaction force Fr to the lever 812 at this time is a superposition of the reaction force Fr by the first elastic member 91 and the reaction force Fr by the second elastic member 92, and thus has a linear relationship.

When the stroke amount X is greater than or equal to X4 and less than X5, as illustrated in FIG. 5, the reaction force Fr to the lever 812 increases as the stroke amount X increases.

Figure 11:
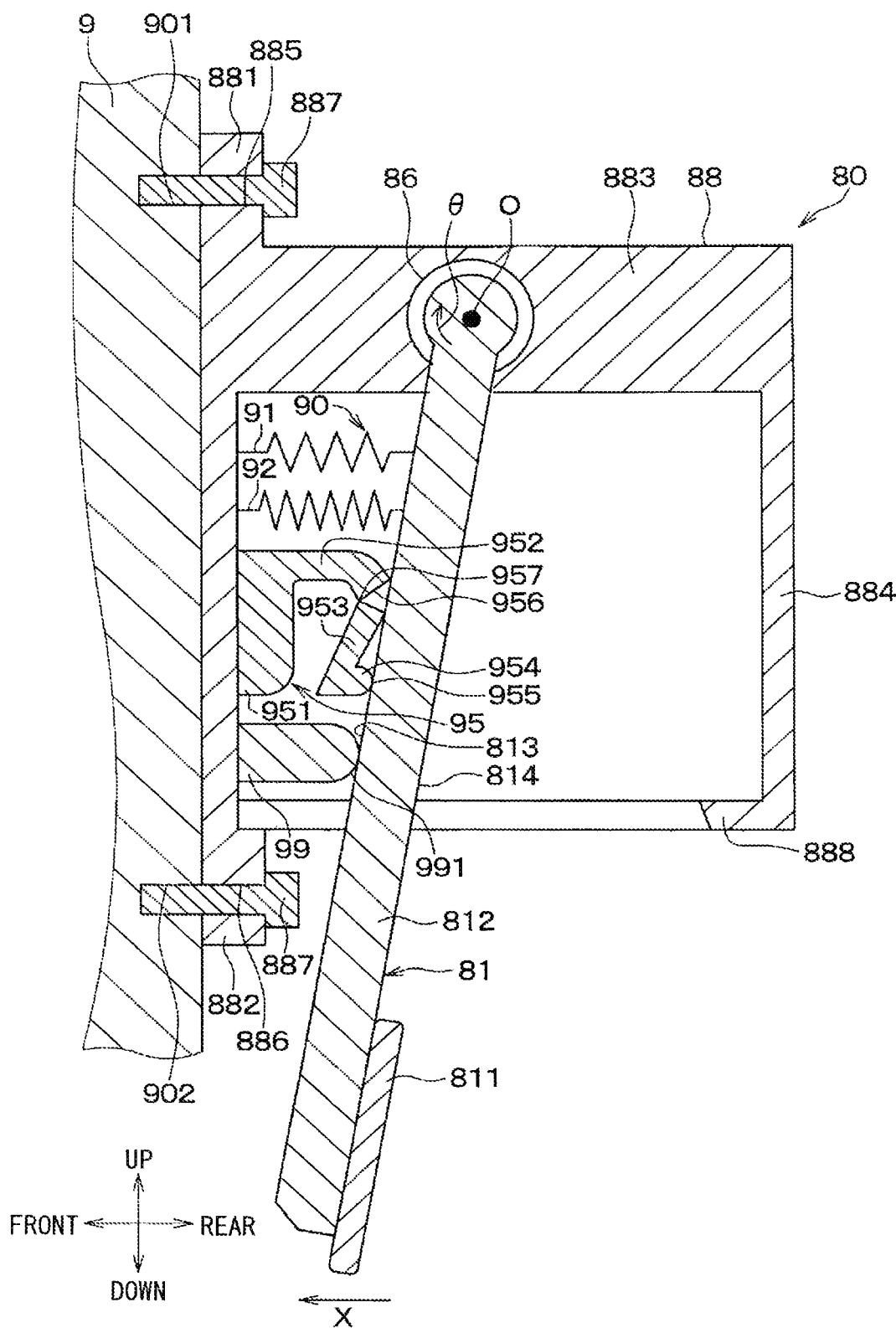
FIG. 11 is a sectional view of the vehicle brake device.

When the stroke amount X is X5, the sensor output Vs is a second sensor predetermined value Vs_th2. At this time, as illustrated in FIG. 11, the lever 812 and the stopper 99 come into contact with each other. Specifically, the lever front surface 813 and the stopper surface 991 come into contact with each other. As a result, the forward rotation of the lever 812 is stopped. Therefore, here, the second sensor predetermined value Vs_th2 is a limit value of the sensor output Vs when the brake pedal 81 is operated. Note that X5 is set by a distance in the front-rear direction from the stopper surface 991 to the lever front surface 813 in the initial state, and the like. A distance in the front-rear direction from the stopper surface 991 to the lever front surface 813 in the initial state is longer than a sum of a distance in the front-rear direction from the contact surface 955 to the lever front surface 813 and the deflection amount of the deformation portion 953 in the initial state until the deformation portion 953 is damaged. Therefore, X5 is greater than X4.

As described above, the vehicle brake device 80 operates.

Figure 12:
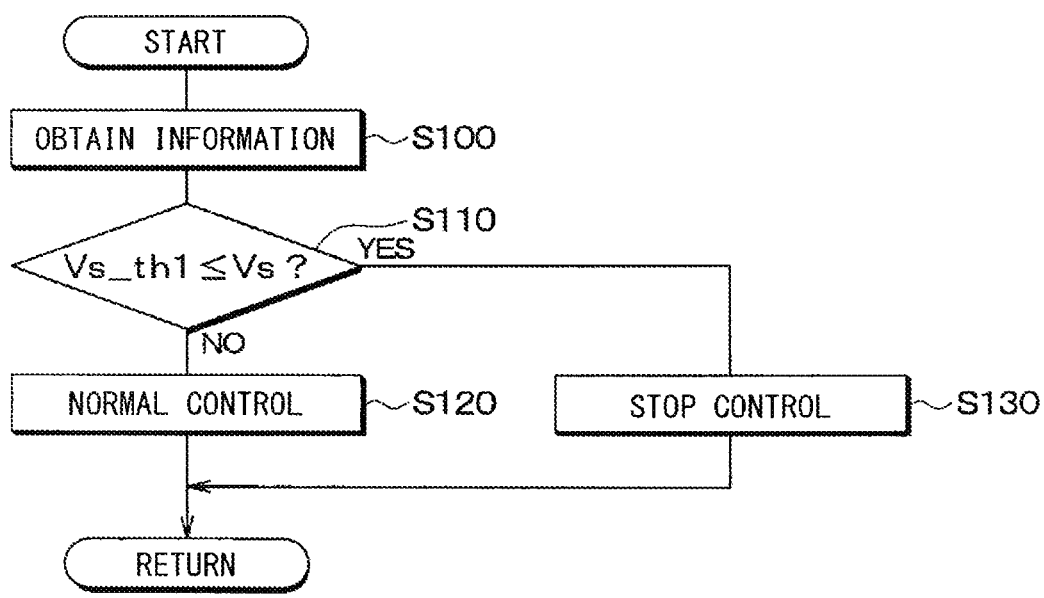
FIG. 12 is a flowchart illustrating processing by an ECU of the vehicle brake system.

Next, in order to describe the improvement of the safety of the vehicle 6 by the vehicle brake device 80, processing of the ECU 53 of the vehicle brake system 1 based on the sensor output Vs from the stroke sensor 86 will be described with reference to a flowchart in FIG. 12. Here, for example, when an ignition of the vehicle 6 is turned on, the ECU 53 executes a program stored in the ROM of the ECU 53.

In step S100, the ECU 53 acquires various types of information. Specifically, the ECU 53 acquires the sensor output Vs corresponding to the stroke amount X of the brake pedal 81 from the stroke sensor 86. The ECU 53 acquires a yaw rate, acceleration, steering angle, each wheel speed, and vehicle speed of the vehicle 6 from a sensor (not illustrated) or the like.

Subsequently, in step S110, the ECU 53 determines whether the operation of the brake pedal 81 is abnormal. Specifically, the ECU 53 determines whether the sensor output Vs acquired in step S100 is greater than or equal to the first sensor predetermined value Vs_th1.

When the sensor output Vs is greater than or equal to the first sensor predetermined value Vs_th1, the stroke amount X is greater than or equal to X4 as described above, and thus the deformation portion 953 is damaged. Thus, at this time, the ECU 53 determines that the operation of the brake pedal 81 is abnormal. Thereafter, the processing proceeds to step S130. Therefore, here, the first sensor predetermined value Vs_th1 is a value indicating that the operation of the brake pedal 81 is abnormal. The first sensor predetermined value Vs_th1 is also a value for instructing execution of control for stopping the vehicle 6 in order to ensure safety of the vehicle 6, as described later.

Here, when the stroke amount X is X5 greater than X4, the lever 812 and the stopper 99 come into contact with each other to stop the forward rotation of the lever 812. Thus, the stroke amount X does not exceed X5, and the sensor output Vs does not exceed the second sensor predetermined value Vs_th2. However, when the sensor output Vs exceeds the second sensor predetermined value Vs_th2 due to a failure or the like of the brake pedal 81 and the stroke sensor 86, the ECU 53 also determines that the operation of the brake pedal 81 is abnormal. Thereafter, the processing proceeds to step S130.

When the sensor output Vs is less than the first sensor predetermined value Vs_th1, the deformation portion 953 is not damaged, and thus the ECU 53 determines that the operation of the brake pedal 81 is normal. Thereafter, the processing proceeds to step S120.

In step S120 subsequent to step S110, since the operation of the brake pedal 81 is normal, the ECU 53 performs normal control on the brake of the vehicle 6. For example, the ECU 53 controls the first actuator 10 on the basis of the sensor output Vs acquired in step S100. For example, the ECU 53 increases the fluid pressure of the brake fluid flowing from the first actuator 10 to the second actuator 20 as the sensor output Vs acquired in step S100 increases. As a result, the brake fluid having a relatively great fluid pressure flows from the first actuator 10 to the second actuator 20. At this time, the ECU 53 controls the second actuator 20. The second actuator 20 causes the brake fluid flowing from the first actuator 10 to the second actuator 20 to flow to the front left W/C 2, the front right W/C 3, the rear left W/C 4, and the rear right W/C 5. Thus, each brake pad (not illustrated) is in frictional contact with a brake disc corresponding to each brake pad. Therefore, since the wheel corresponding to each brake disc is decelerated, the vehicle 6 decelerates. As a result, the vehicle 6 stops.

The ECU 53 also performs ABS control, VSC control, and the like. ABS is an abbreviation for antilock brake system. VSC is an abbreviation for vehicle stability control.

For example, the ECU 53 calculates slip ratios of the front left wheel FL, the front right wheel FR, the rear left wheel RL, and the rear right wheel RR on the basis of the wheel speeds and the vehicle speed acquired in step S100. Then, the ECU 53 determines whether to execute the ABS control on the basis of the slip rates. When executing the ABS control, the ECU 53 performs any of a pressure reducing mode, a holding mode, and a pressure increasing mode in accordance with the slip rates. In the pressure reducing mode, the pressure increasing control valve (not illustrated) of the second actuator 20 corresponding to a wheel to be controlled is brought into a shut-off state, and the pressure reducing control valve (not illustrated) of the second actuator 20 is brought into an appropriate communication state, and thus the W/C pressure corresponding to the wheel to be controlled is reduced. In the holding mode, the pressure increasing control valve and the pressure reducing control valve (not illustrated) of the second actuator 20 corresponding to the wheel to be controlled are brought into a shut-off state, and thus the W/C pressure corresponding to the wheel to be controlled is held. In the pressure increasing mode, the pressure reducing control valve (not illustrated) of the second actuator 20 corresponding to a wheel to be controlled is brought into a shut-off state, and the pressure increasing control valve (not illustrated) of the second actuator 20 is brought into an appropriate communication state, and thus the W/C pressure corresponding to the wheel to be controlled is increased. Since the slip rate of each wheel of the vehicle 6 is controlled in this manner, the front left wheel FL, the front right wheel FR, the rear left wheel RL, and the rear right wheel RR are prevented from being locked.

For example, the ECU 53 calculates a sideslip state of the vehicle 6 on the basis of the yaw rate, the steering angle, the acceleration, the wheel speeds, the vehicle speed, and the like acquired in step S100. Then, the ECU 53 determines whether to execute the VSC control on the basis of the sideslip state of the vehicle 6. When executing the VSC control, the ECU 53 selects a wheel to be controlled for stabilizing turning of the vehicle 6 on the basis of the sideslip state of the vehicle 6. The ECU 53 controls the second actuator 20 such that the W/C pressure corresponding to the selected wheel to be controlled increases. As a result, the brake fluid pressure of the W/C corresponding to the wheel to be controlled increases, and thus a sideslip of the vehicle 6 is suppressed. Therefore, traveling of the vehicle 6 is stabilized.

In this manner, the ECU 53 performs normal control of a brake of the vehicle 6. Thereafter, the processing returns to step S100. At this time, the ECU 53 may perform collision avoidance control, regenerative cooperative control, and the like on the basis of a signal from another ECU (not illustrated).

In step S130 subsequent to step S110, since the sensor output Vs is greater than or equal to the first sensor predetermined value Vs_th1 and the operation of the brake pedal 81 is abnormal, the ECU 53 forcibly stops the vehicle 6 to ensure the safety of the vehicle 6. For example, the ECU 53 controls the first actuator 10 such that the fluid pressure of the brake fluid flowing from the first actuator 10 to the second actuator 20 becomes a predetermined fluid pressure. The ECU 53 controls the second actuator 20 such that the braking force of the vehicle 6 becomes relatively great on the basis of the slip ratio of the vehicle 6 and the like. As a result, the second actuator 20 adjusts the fluid pressure of the brake fluid flowing from the first actuator 10 on the basis of the signal from the ECU 53. The brake fluid adjusted by the second actuator 20 flows to the front left W/C 2, the front right W/C 3, the rear left W/C 4, and the rear right W/C 5. Thus, each brake pad (not illustrated) is in frictional contact with a brake disc corresponding to each brake pad. Therefore, since the wheel corresponding to each brake disc is decelerated, the vehicle 6 decelerates. As a result, the vehicle 6 is forcibly stopped.

In this manner, the processing of the ECU 53 of the vehicle brake system 1 is performed. In the vehicle brake system 1, the vehicle brake device 80 improves the safety of the vehicle 6. Hereinafter, the improvement of the safety by the vehicle brake device 80 will be described.

In the vehicle brake device 80, when the deformation portion 953 is damaged as illustrated in FIG. 10, the stroke amount X is greater than or equal to X4 and less than X5 as illustrated in FIG. 5. At this time, the stroke sensor 86 outputs a value indicating that the operation of the brake pedal 81 is abnormal and instructing execution of control for stopping the vehicle 6. Specifically, the stroke sensor 86 outputs the sensor output Vs that is greater than or equal to the first sensor predetermined value Vs_th1 to the ECU 53. As a result, the vehicle 6 can be stopped when the operation of the brake pedal 81 is abnormal. Specifically, the processing of the ECU 53 shifts from step S110 to step S130, and thus the ECU 53 forcibly stops the vehicle 6 in order to ensure the safety of the vehicle 6. Therefore, the safety of the vehicle 6 is secured, and the safety of the vehicle 6 is improved.

The vehicle brake device 80 also has effects as described below.

[1] The deformation portion 953 of the deformation member 95 is deformed by receiving a force from the lever 812 when the brake pedal 81 is operated in a state where the reaction force Fr by the first elastic member 91 and the second elastic member 92 is generated. As a result, the deformation portion 953 generates the reaction force Fr. At this time, the driver operating the brake pedal 81 can feel a relatively great reaction force Fr. Therefore, deformation of the first elastic member 91 and the second elastic member 92 can be restricted such that the first elastic member 91 and the second elastic member 92 are not excessively deformed when the brake pedal 81 is operated.

[2] In the vehicle brake device 80, as illustrated in FIGS. 5 and 11, when the stroke amount X is X5 greater than X4, which is the stroke amount X when the deformation portion 953 is damaged, the lever 812 and the stopper 99 come into contact with each other. As a result, the forward rotation of the lever 812 is stopped, and this stop suppresses uneasiness of the driver of the vehicle 6 caused by excessive rotation of the lever 812.

[3] The deformation member 95 is disposed on/in the housing 88. Specifically, the deformation member 95 is disposed on the front side of the housing cylindrical portion 884. Here, the housing 88, which is attached to the dash panel 9, is fixed. As a result, the deformation member 95 is fixed by the housing 88 and does not move, and therefore, fragments of the deformation portion 953 damaged by the brake pedal 81 are relatively less likely to scatter as compared with a case where the deformation member 95 is disposed on the brake pedal 81 which is moveable.

[4] As illustrated in FIG. 5, when the stroke amount X is greater than or equal to X2, the deformation member 95 comes into contact with the lever 812. Specifically, the contact surface 955 of the deformation portion 953 and the lever front surface 813 come into contact with each other. Here, the contact surface 955 has a shape of a side surface of a semicircular column, and is curved convexly toward the lever front surface 813. Thus, the contact between the contact surface 955 of the deformation portion 953 and the lever front surface 813 is a line contact. As a result, a contact area between the contact surface 955 and the lever front surface 813 is reduced as compared with a case where the contact surface 955 and the lever front surface 813 are in surface contact, and thus the accuracy of a position where the contact surface 955 and the lever front surface 813 are in contact with each other is improved. In addition, since variation in the force received by the deformation portion 953 from the lever 812 is suppressed, the accuracy of the force received by the deformation portion 953 from the lever 812 is improved. Since the accuracy of the stress applied to the deformation portion 953 is improved, accuracy of the stroke amount X when the deformation portion 953 is deformed, here, X2, X3, and X4 described above is improved. Therefore, the accuracy of the sensor output Vs corresponding to each of X2, X3, and X4 is improved.

Here, the contact surface 955 may have a hemispherical shape, and may be curved convexly toward the lever front surface 813. In this case, the contact between the contact surface 955 of the deformation portion 953 and the lever front surface 813 is a point contact. Accordingly, the contact area between the contact surface 955 and the lever front surface 813 becomes relatively small. Therefore, similarly to the above, the accuracy of the sensor output Vs corresponding to each of X2, X3, and X4 is improved.

[5] The deformation portion 953 includes the recess 956 and the easily deformable portion 957. Due to the recess 956, the cross section in the depth direction of the recess 956 in the easily deformable portion 957 is smallest among the cross sections in the depth direction of the recess 956 in the deformation portion 953. Thus, when a force is applied to the deformation portion 953, a stress applied to the easily deformable portion 957 is the greatest among stresses applied to the deformation portion 953. Therefore, the easily deformable portion 957 is likely to serve as a starting point when the deformation portion 953 is deformed. The accuracy of the stroke amount X when the deformation portion 953 is deformed, here, X2, X3, and X4 is improved. Therefore, the accuracy of the sensor output Vs corresponding to each of X2, X3, and X4 is improved.

Second Embodiment

In a second embodiment, a configuration of the deformation member is different. When the sensor output Vs is greater than or equal to the first sensor predetermined value Vs_th1, the stroke amount X is different. The other configurations are similar to those of the first embodiment.

Figure 13:
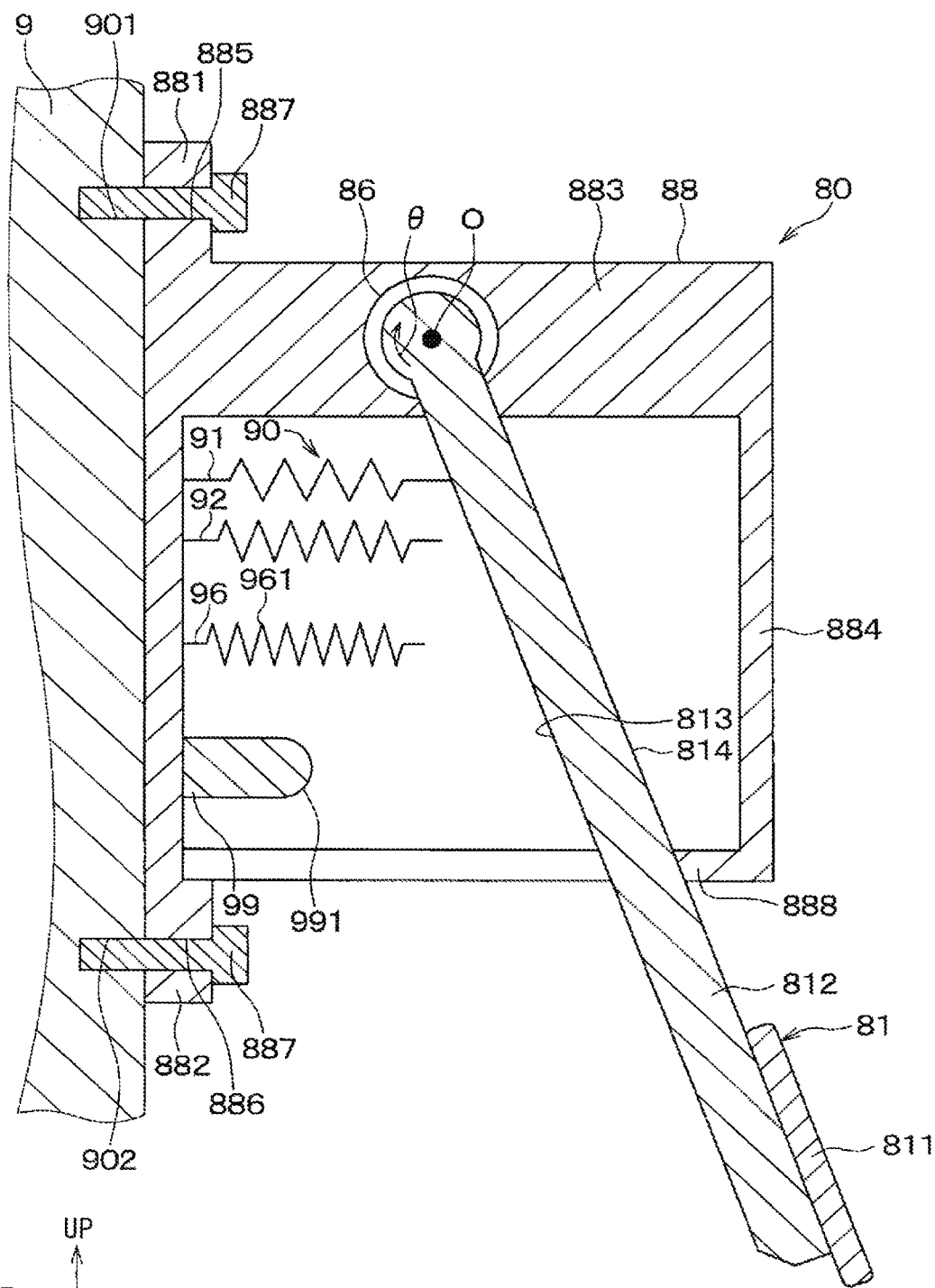
FIG. 13 is a sectional view of a vehicle brake device according to a second embodiment.

As illustrated in FIG. 13, the deformation member 96 is a compression coil spring. The one end of the deformation member 96 is connected to the front side of the housing cylindrical portion 884. The other end of the deformation member 96 is not connected to the lever 812 in the initial state and faces the lever front surface 813. Therefore, the other end of the deformation member 96 is not in contact with the lever front surface 813 in the initial state. A distance in the front-rear direction from the other end of the deformation member 96 to the lever front surface 813 in the initial state is longer than the distance in the front-rear direction from the other end of the second elastic member 92 to the lever front surface 813 in the initial state. The distance in the front-rear direction from the stopper surface 991 to the lever front surface 813 in the initial state is longer than the distance in the front-rear direction from the other end of the deformation member 96 to the lever front surface 813 in the initial state.

The deformation member 96 includes a deformation portion 961 having a coil shape. As will be described later, the deformation portion 961 is elastically deformed by the force received by the deformation member 96 from the lever 812 when the brake pedal 81 is operated. Here, an elastic modulus of the deformation member 96 is greater than the elastic modulus of the first elastic member 91 and the elastic modulus of the second elastic member 92.

Next, the operation of the vehicle brake device 80 provided with the deformation member 96 will be described with reference to a chart illustrating a relationship between the stroke amount X, the reaction force Fr, and the sensor output Vs in FIG. 14, and FIGS. 13, 15, and 16.

Figure 14:
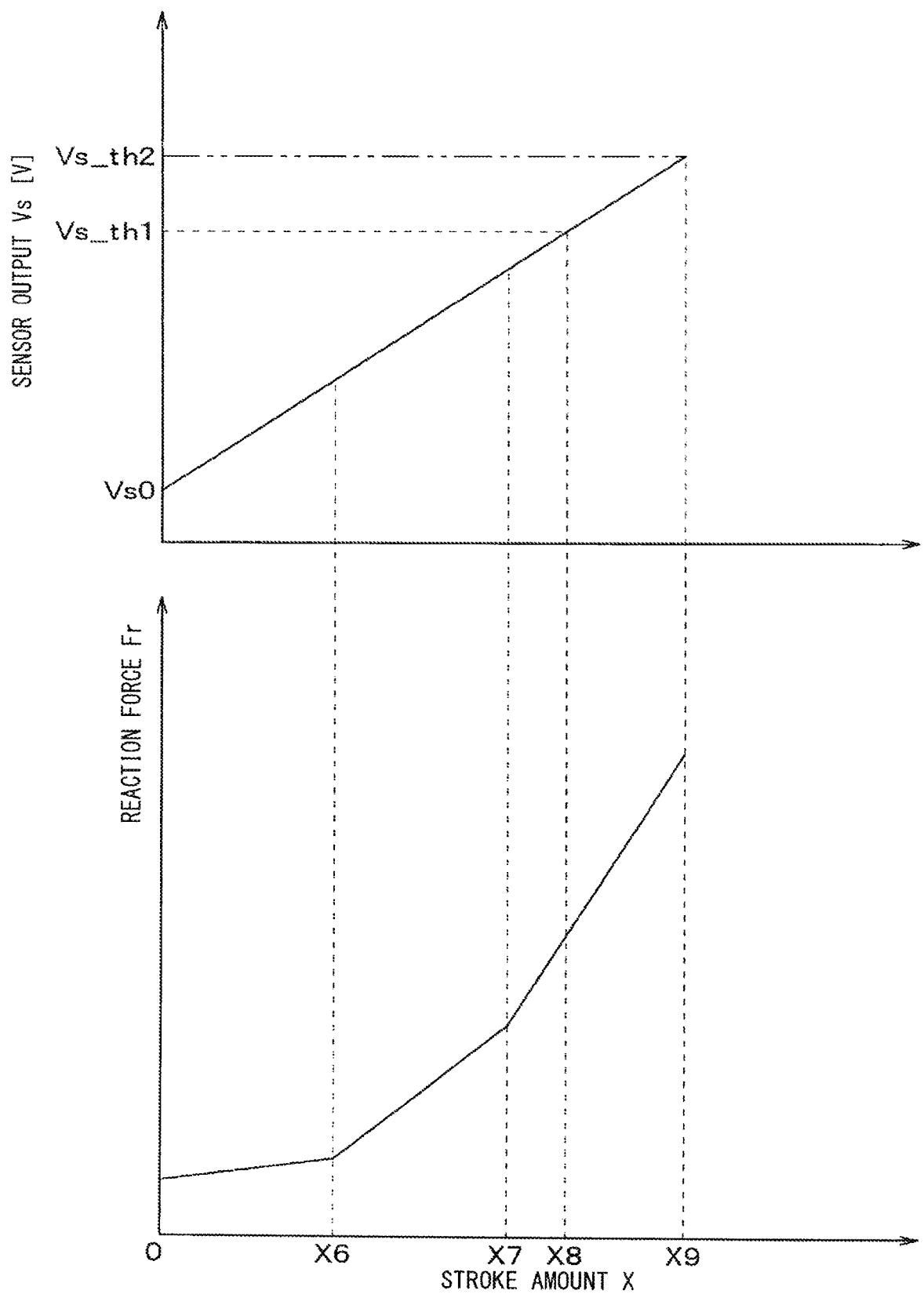
FIG. 14 is a chart illustrating a relationship between a stroke amount, a reaction force, and a sensor output.

As shown in FIG. 13, before the brake pedal 81 is operated and in the initial state where the stroke amount X is 0, the lever 812 is biased by the first elastic member 91, similarly to the above. As a result, the housing extension 888 and the lever rear surface 814 come into contact with each other. At this time, the housing extension 888 supports the lever 812. Therefore, the lever 812 does not rotate in the initial state. At this time, as illustrated in FIG. 14, the sensor output Vs of the stroke sensor 86 is Vs0 which is a value in the initial state.

The brake pedal 81 is operated by the pedal effort of the driver of the vehicle 6, and the stroke amount X becomes greater than 0 and less than X6. At this time, similarly to the above, since the stroke amount X and the sensor output Vs of the stroke sensor 86 have a linear relationship, the sensor output Vs increases as the stroke amount X increases.

At this time, similarly to the above, the force corresponding to the pedal effort of the driver of the vehicle 6 is transmitted from the lever 812 to the first elastic member 91. As a result, the reaction force Fr to the lever 812 by the restoring force of the first elastic member 91 is generated.

When the stroke amount X is X6, the lever front surface 813 and the other end of the second elastic member 92 come into contact with each other. Note that similarly to X1 described above, X6 is set by the distance in the front-rear direction from the other end of the second elastic member 92 to the lever front surface 813, and the like in the initial state.

The brake pedal 81 is operated by the pedal effort of the driver of the vehicle 6, and the stroke amount X becomes greater than or equal to X6 and less than X7. At this time, similarly to the above, as the stroke amount X increases, the sensor output Vs increases.

At this time, similarly to the above, the force corresponding to the pedal effort of the driver of the vehicle 6 is transmitted from the lever 812 to the first elastic member 91 and the second elastic member 92. Thus, the reaction force Fr to the lever 812 is generated by the restoring force of the first elastic member 91 and the second elastic member 92. Here, the elastic modulus of the second elastic member 92 is greater than the elastic modulus of the first elastic member 91. Thus, an amount of change in the reaction force Fr with respect to the stroke amount X when the stroke amount X is greater than or equal to X7 and less than X8 is relatively great. As a result, the force corresponding to a braking force of the vehicle 6 easily acts on the driver of the vehicle 6, and it is easy to drive the vehicle 6.

When the stroke amount X is X7, the lever 812 and the deformation member 96 come into contact with each other. Specifically, the lever front surface 813 and the other end of the deformation member 96 come into contact with each other. Note that X7 is set by a distance in the front-rear direction from the other end of the deformation member 96 to the lever front surface 813, and the like in the initial state. Here, the operation range of the brake pedal 81 when the stroke amount X is less than or equal to X7 is a normal use range of the brake pedal 81. As described below, the operation range of the brake pedal 81 when the stroke amount X is greater than X7 is a range for overload detection.

The brake pedal 81 is operated by the pedal effort of the driver of the vehicle 6, and the stroke amount X becomes greater than X7 and less than X8. At this time, similarly to the above, as the stroke amount X increases, the sensor output Vs increases.

At this time, similarly to the above, the force corresponding to the pedal effort of the driver of the vehicle 6 is transmitted from the lever 812 to the first elastic member 91 and the second elastic member 92. As a result, the reaction force Fr to the lever 812 by the restoring force of the first elastic member 91 and the second elastic member 92 is generated.

Figure 15:
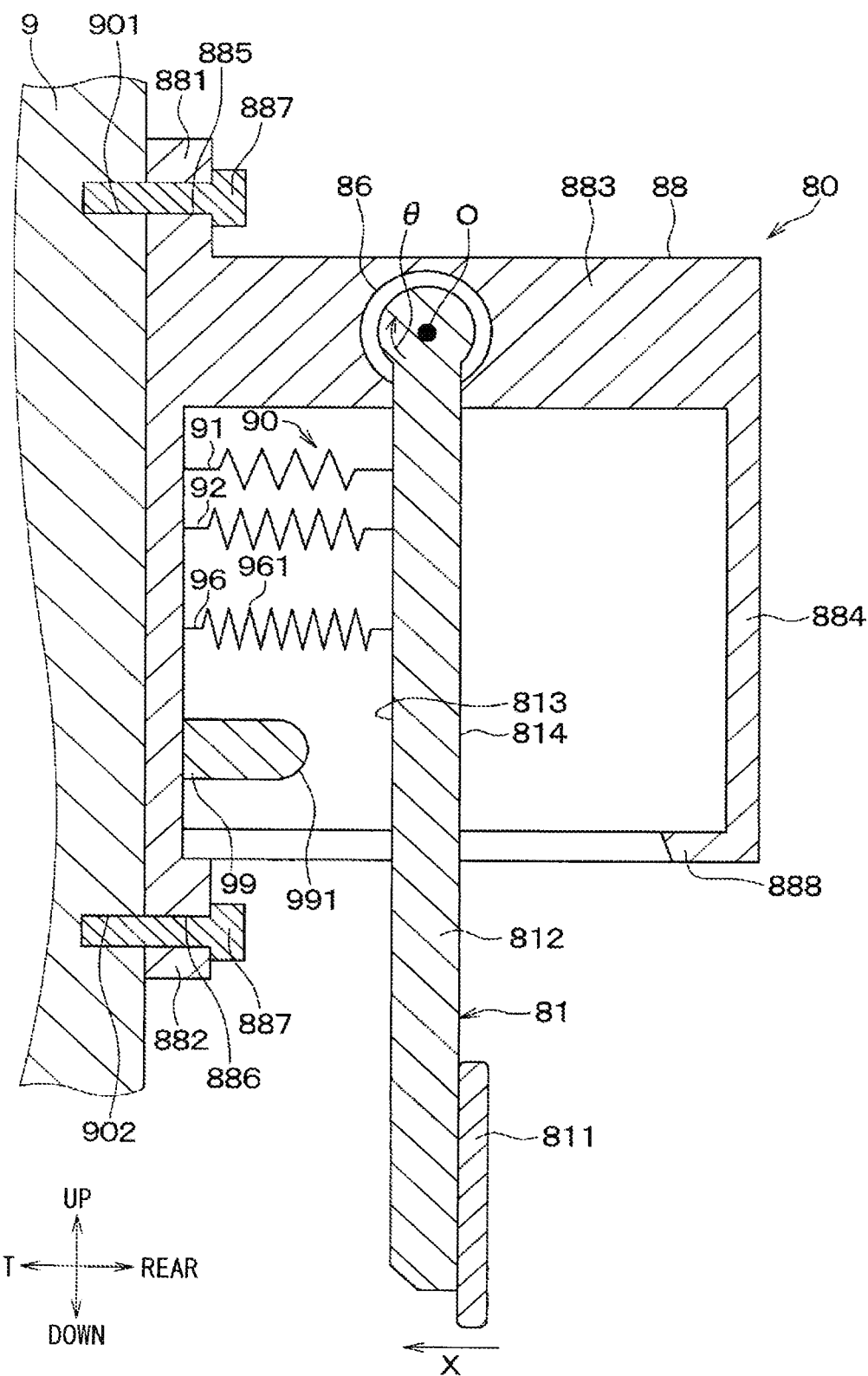
FIG. 15 is a sectional view of the vehicle brake device.

At this time, as illustrated in FIG. 15, a force corresponding to the pedal effort of the driver of the vehicle 6 is transmitted from the lever 812 to the deformation member 96. As a result, the deformation portion 961 of the deformation member 96 is compressed and elastically deformed. Therefore, a restoring force of the deformation portion 961 is generated. The reaction force Fr to the lever 812 is generated by the restoring force of the deformation portion 961.

At this time, the reaction force Fr to the lever 812 is generated by the restoring force of the first elastic member 91, the second elastic member 92, and the deformation portion 961.

The restoring force of the deformation portion 961 is proportional to a deformation amount of the deformation portion 961. The deformation amount of the deformation portion 961 is proportional to the stroke amount X. The restoring force of the deformation portion 961 is proportional to the stroke amount X. Thus, the reaction force Fr by the deformation portion 961 and the stroke amount X have a linear relationship.

Thus, as described above, the stroke amount X and the reaction force Fr by the first elastic member 91 and the second elastic member 92 have a linear relationship. Therefore, the reaction force Fr to the lever 812 at this time is a superposition of the reaction force Fr by the first elastic member 91, the reaction force Fr by the second elastic member 92, and the reaction force Fr by the deformation portion 961, and thus has a linear relationship.

When the stroke amount X is greater than or equal to X7 and less than X8, as illustrated in FIG. 14, the reaction force Fr to the lever 812 increases as the stroke amount X increases. Here, the elastic modulus of the deformation member 96 is greater than the elastic modulus of the first elastic member 91 and the elastic modulus of the second elastic member 92. Thus, an amount of change in the reaction force Fr with respect to the stroke amount X when the stroke amount X is greater than or equal to X7 and less than X8 is sufficiently greater than an amount in change of the reaction force Fr with respect to the stroke amount X when the stroke amount X is less than X7. As a result, when the stroke amount X reaches X7 or greater, the driver of the vehicle 6 can feel the brake pedal 81 hitting the deformation member 96.

When the stroke amount X is X8, the sensor output Vs is the first sensor predetermined value Vs_th1. At this time, similarly to the above, the force corresponding to the pedal effort of the driver of the vehicle 6 is transmitted from the lever 812 to the first elastic member 91, the second elastic member 92, and the deformation member 96. Thus, the reaction force Fr to the lever 812 by the first elastic member 91, the second elastic member 92, and the deformation member 96 is generated. Therefore, the reaction force Fr to the lever 812 at this time is a superposition of the reaction force Fr by the first elastic member 91, the reaction force Fr by the second elastic member 92, and the reaction force Fr by the deformation portion 961.

The brake pedal 81 is operated by the pedal effort of the driver of the vehicle 6, and the stroke amount X becomes greater than or equal to X8 and less than X9. At this time, similarly to the above, as the stroke amount X increases, the sensor output Vs increases.

At this time, similarly to the above, the force corresponding to the pedal effort of the driver of the vehicle 6 is transmitted from the lever 812 to the first elastic member 91, the second elastic member 92, and the deformation member 96. Thus, the reaction force Fr to the lever 812 by the first elastic member 91, the second elastic member 92, and the deformation member 96 is generated.

Figure 16:
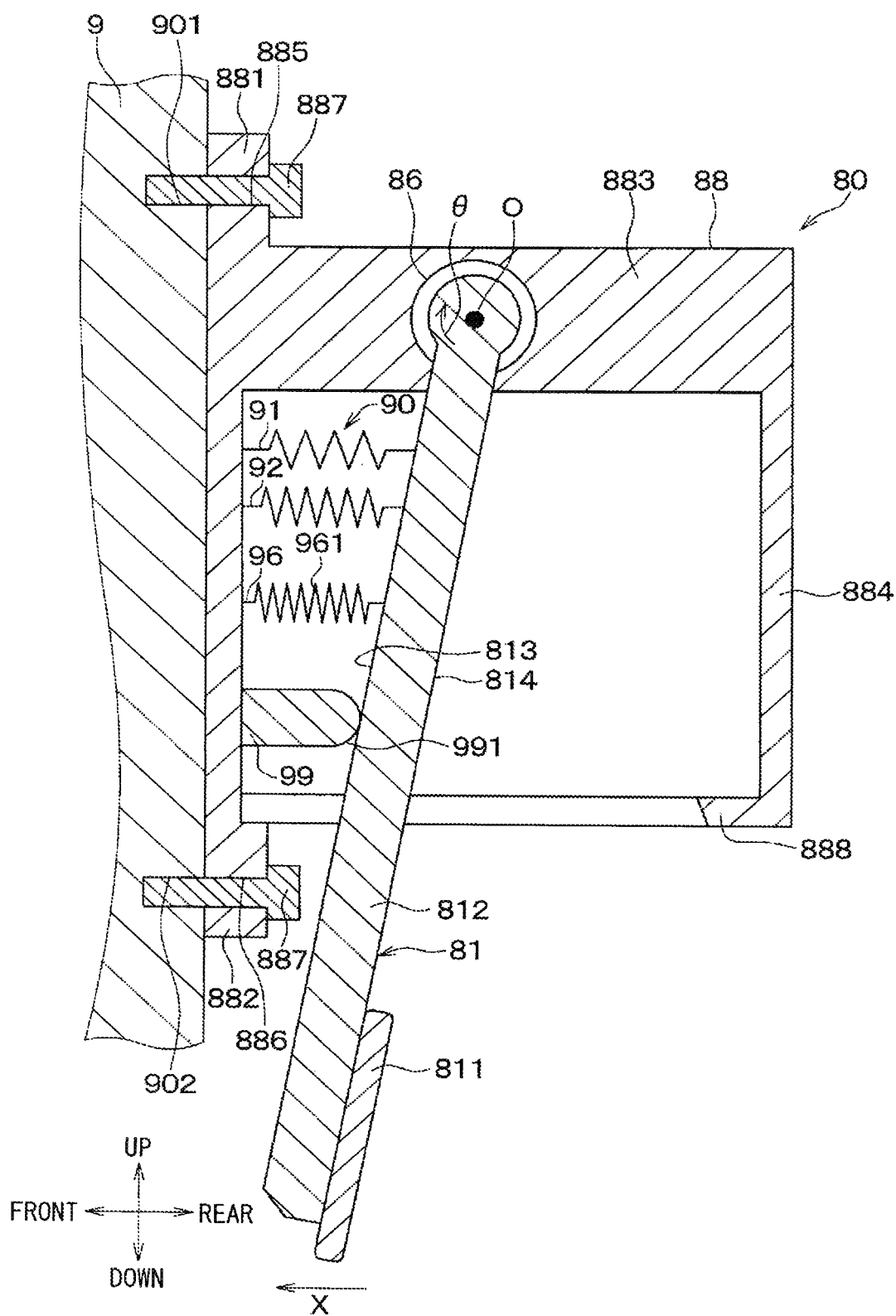
FIG. 16 is a sectional view of the vehicle brake device.

When the stroke amount X is X9, the sensor output Vs is the second sensor predetermined value Vs_th2. At this time, as illustrated in FIG. 16, the lever 812 and the stopper 99 come into contact with each other. Specifically, the lever front surface 813 and the stopper surface 991 come into contact with each other. As a result, the forward rotation of the lever 812 is stopped. Note that similarly to X5 described above, X9 is set by the distance in the front-rear direction from the stopper surface 991 to the lever front surface 813, and the like in the initial state. The distance in the front-rear direction from the stopper surface 991 to the lever front surface 813 in the initial state is as follows. This distance is longer than a sum of the distance in the front-rear direction from the other end of the deformation member 96 to the lever front surface 813 in the initial state and the deformation amount of the deformation portion 961 when the sensor output Vs is the first sensor predetermined value Vs_th1. Therefore, X9 is greater than X8.

As described above, the vehicle brake device 80 operates.

Similarly to the above, the ECU 53 of the vehicle brake system 1 acquires the sensor output Vs corresponding to the stroke amount X from the stroke sensor 86 in step S100. The ECU 53 performs one of the normal control or stop control in the brake of the vehicle 6 on the basis of the acquired sensor output Vs. Specifically, when the sensor output Vs is less than the first sensor predetermined value Vs_th1, the operation of the brake pedal 81 is normal. Thus, the ECU 53 performs the normal control in step S120. When the sensor output Vs is greater than or equal to the first sensor predetermined value Vs_th1, the operation of the brake pedal 81 is abnormal. Thus, the ECU 53 performs the stop control in step S130. In this way, the safety of the vehicle 6 is ensured.

In the second embodiment, effects similar to effects of the first embodiment are obtained. In the second embodiment, the deformation member 96, which is a compression coil spring, is less likely to be damaged. Thus, effects similar to the effects described in [3] are obtained. Since the deformation member 96 is a compression coil spring, a contact area between the deformation member 96 and the lever front surface 813 is relatively small. Thus, effects similar to the effects described in [4] are obtained. Since the deformation member 96 is a compression coil spring, the deformation amount of the deformation portion 961 is in a proportional relationship with the stroke amount X, and thus is in a linear relationship with the stroke amount X. Accordingly, the accuracy of the stroke amount X when the deformation portion 961 is deformed is significantly high. Thus, effects similar to the effects described in [5] are obtained.

Third Embodiment

A third embodiment is similar to the first embodiment except that the arrangement of the deformation member is different.

Figure 17:
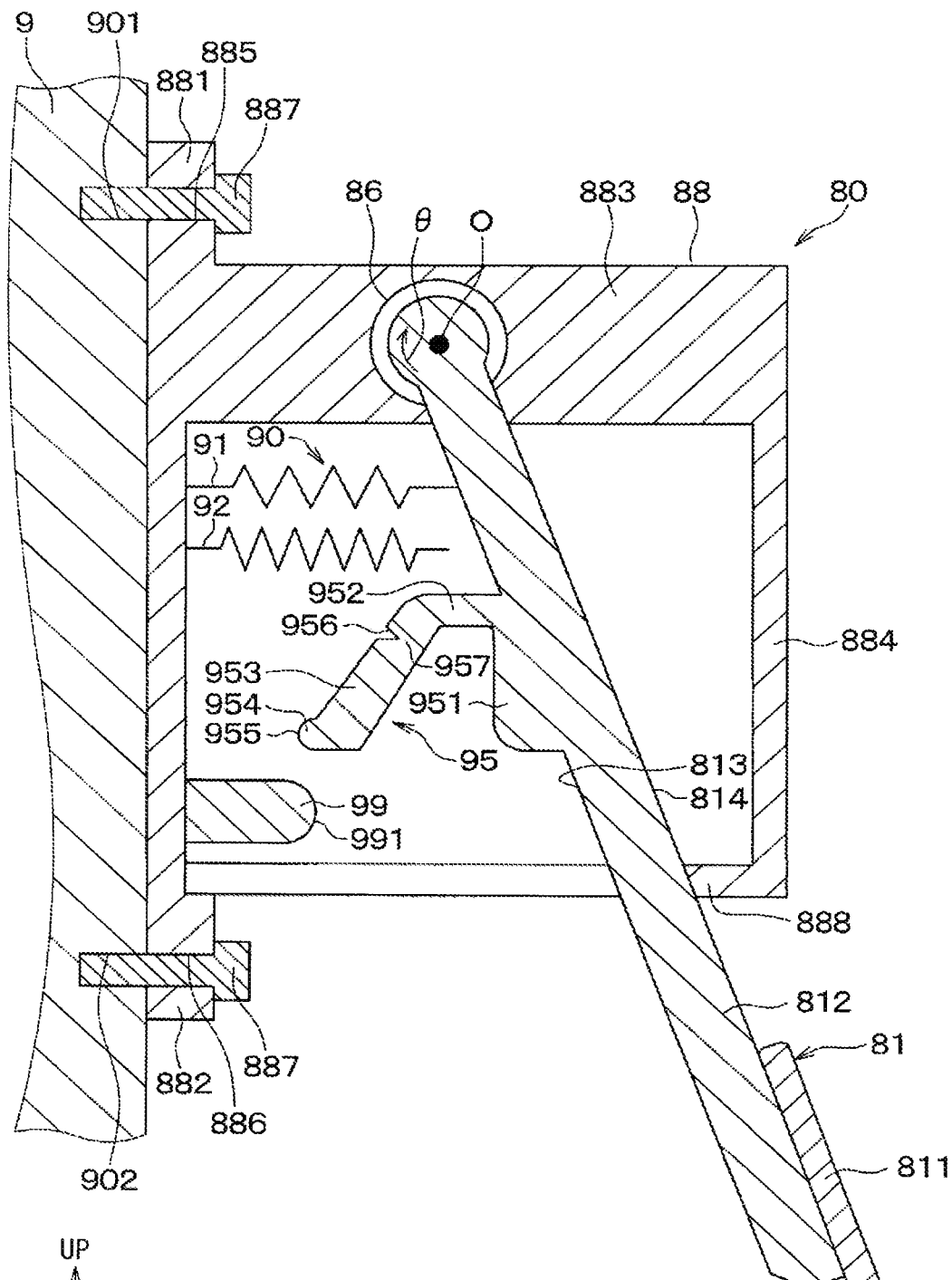
FIG. 17 is a sectional view of a vehicle brake device according to a third embodiment.

Here, as illustrated in FIG. 17, the deformation member 95 is disposed on the lever 812. Here, the deformation member 95 is integrated with the lever 812. Specifically, the base 951 of the deformation member 95 is connected to the lever front surface 813 and extends in a direction along the lever front surface 813. Similarly to the above, the extension 952 is connected to the upper side of the base 951 and the upper side of the deformation portion 953 and extends in the front-rear direction. The deformation portion 953 of the deformation member 95 is connected to the front side of the extension 952 and extends in the up-down direction and in a direction from the extension 952 toward the front side of the housing cylindrical portion 884. The contact 954 of the deformation portion 953 protrudes toward the front side of the housing cylindrical portion 884, here, forward. Here, the deformation member 95 is integrated with the lever 812, but may be separated from the lever 812.

In the third embodiment, effects similar to the effects of the first embodiment are obtained. In the third embodiment, since the deformation member 95 is disposed on the lever 812, the effects described in [3] are not obtained.

Fourth Embodiment

A fourth embodiment is similar to the first embodiment except that the configuration of the deformation member is different.

Figure 18:
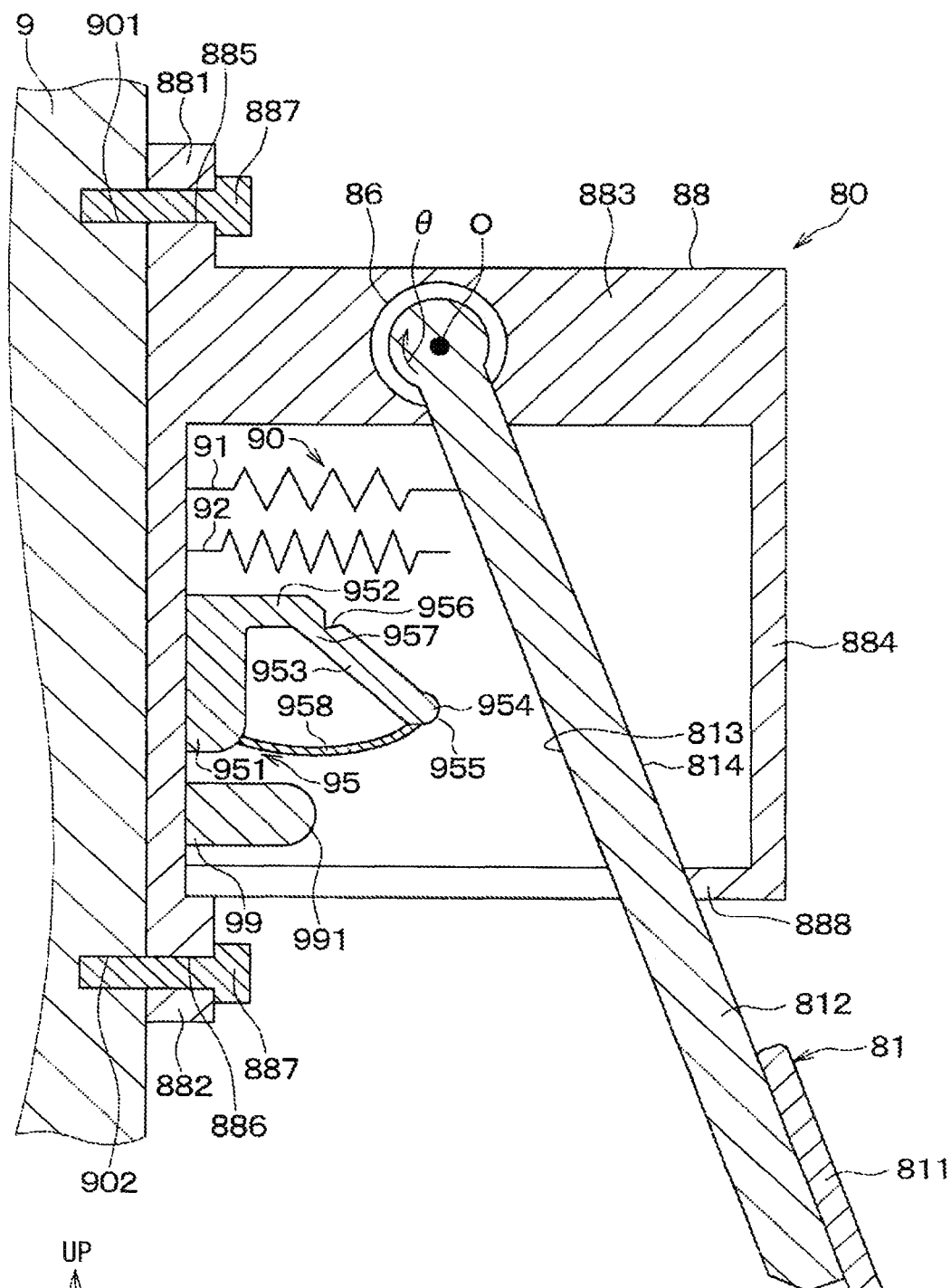
FIG. 18 is a sectional view of a vehicle brake device according to a fourth embodiment.
Figure 19:
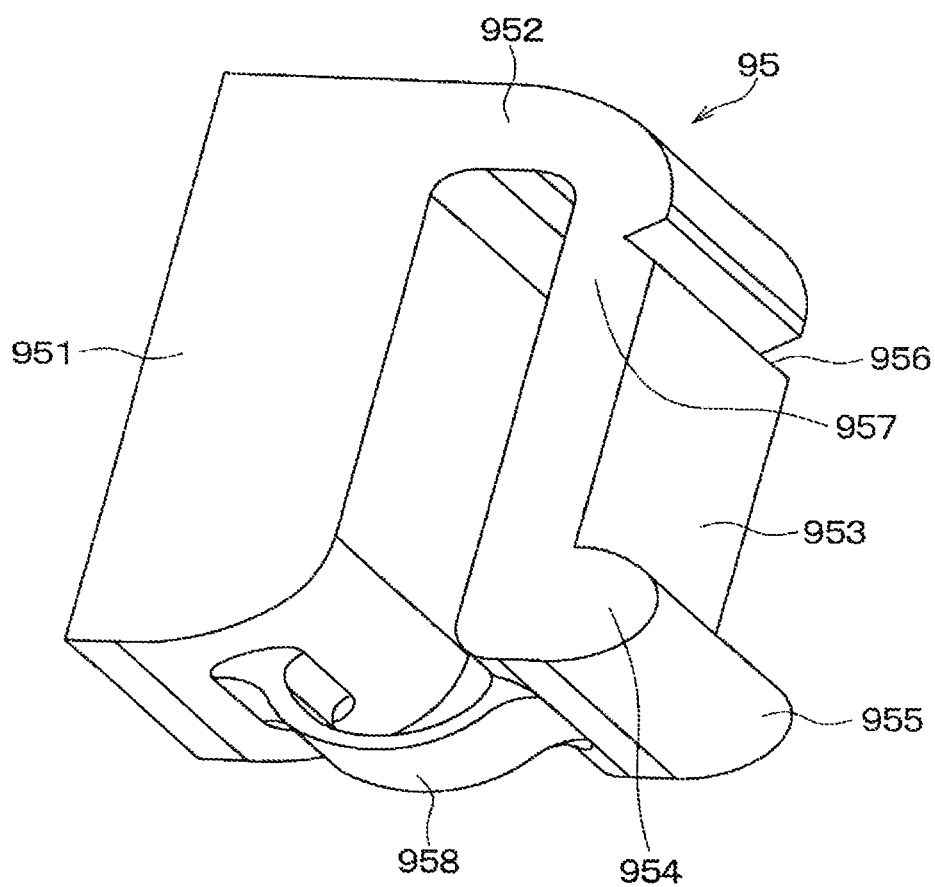
FIG. 19 is a perspective view of a deformation member of the vehicle brake device.

Here, as illustrated in FIGS. 18 and 19, the deformation member 95 further includes a holder 958 in addition to the base 951, the extension 952, the deformation portion 953, the recess 956, and the easily deformable portion 957 described above.

The holder 958 is a leaf spring, and is connected to the lower side of the base 951 and the lower side of the deformation portion 953. Therefore, the holder 958 is elastically deformed as the deformation portion 953 is deformed. Specifically, the holder 958 is deflected by receiving the force transmitted from the deformation portion 953.

Figure 20:
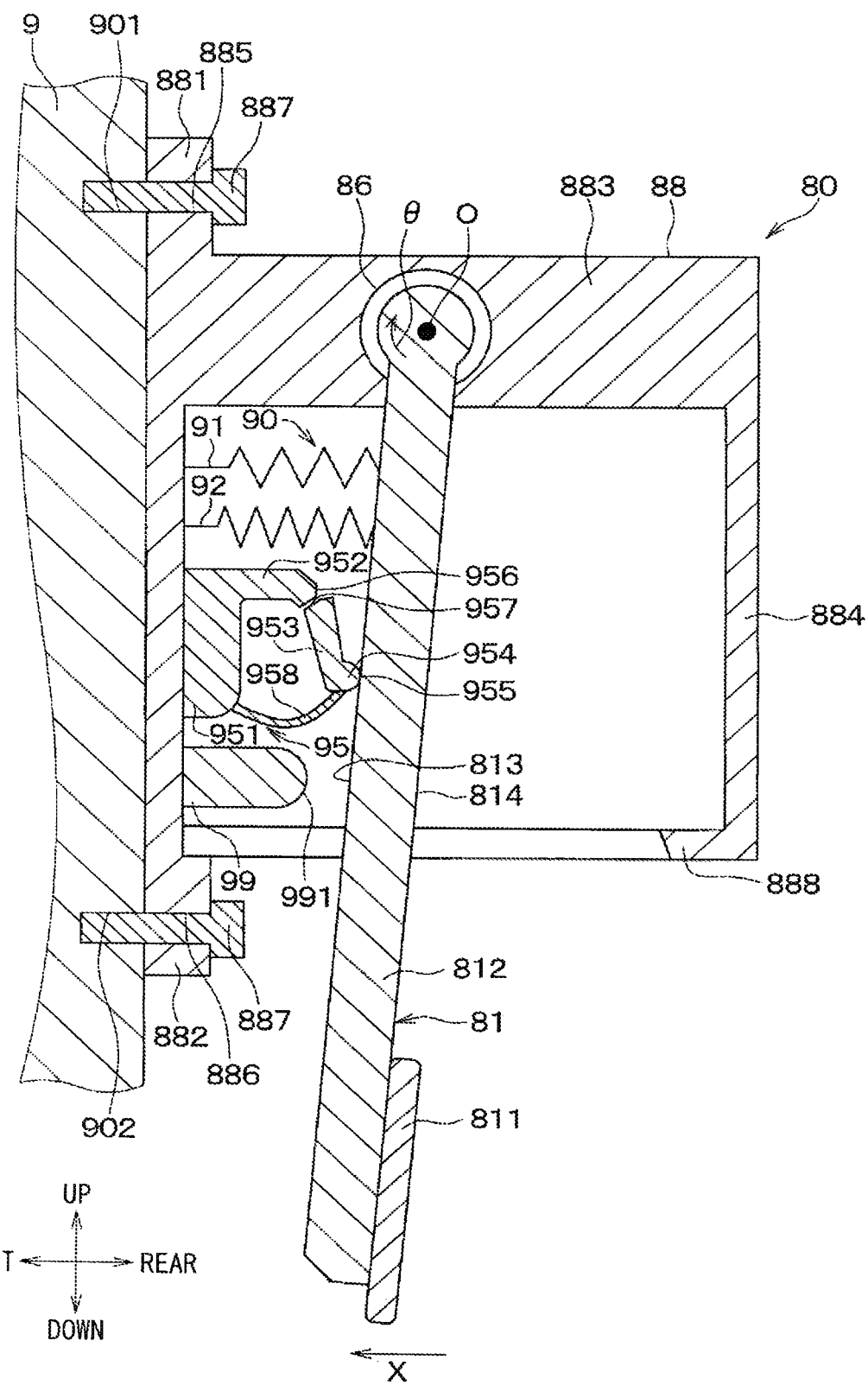
FIG. 20 is a sectional view of the vehicle brake device.

Here, as described above, when the stroke amount X is X4, that is, when the sensor output Vs is the first sensor predetermined value Vs_th1, the deformation portion 953 is damaged by the force transmitted from the lever 812 to the deformation portion 953. Specifically, since the easily deformable portion 957 is most easily deformed in the deformation portion 953, the easily deformable portion 957 breaks. At this time, as illustrated in FIG. 20, the holder 958 receives the force transmitted from the lever 812 via the deformation portion 953, and is deflected together with the deformation of the deformation portion 953. Here, as described above, the holder 958 is connected to the lower side of the base 951 and the lower side of the deformation portion 953. Therefore, even if the easily deformable portion 957 breaks and the deformation portion 953 is detached from the extension 952, the holder 958 holds the deformation portion 953 such that the deformation portion 953 does not scatter.

In the fourth embodiment, effects similar to the effects of the first embodiment are obtained.

Fifth Embodiment

A fifth embodiment is similar to the fourth embodiment except that the configurations of the deformation member and the stopper are different.

Figure 21:
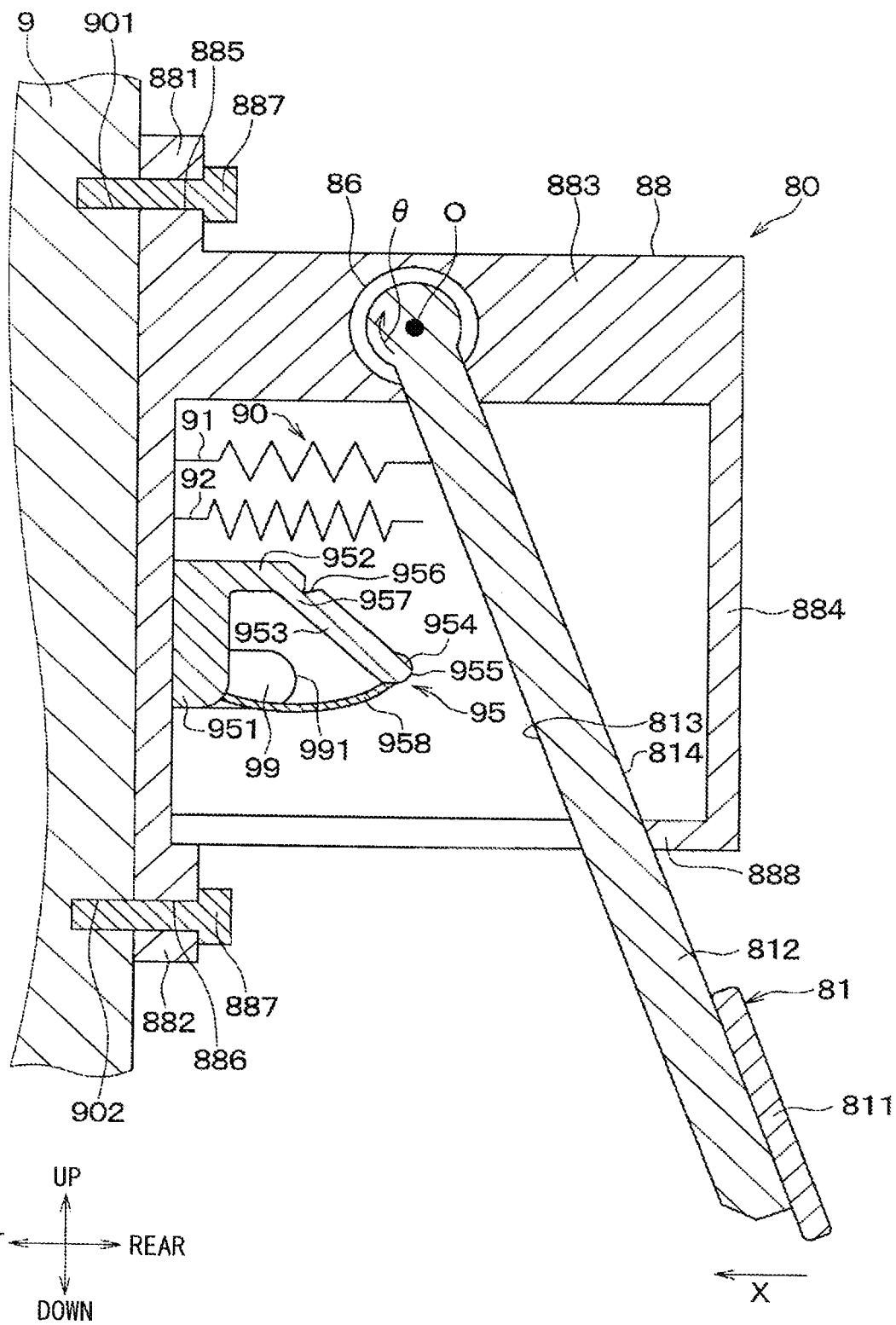
FIG. 21 is a sectional view of a vehicle brake device according to a fifth embodiment.
Figure 22:
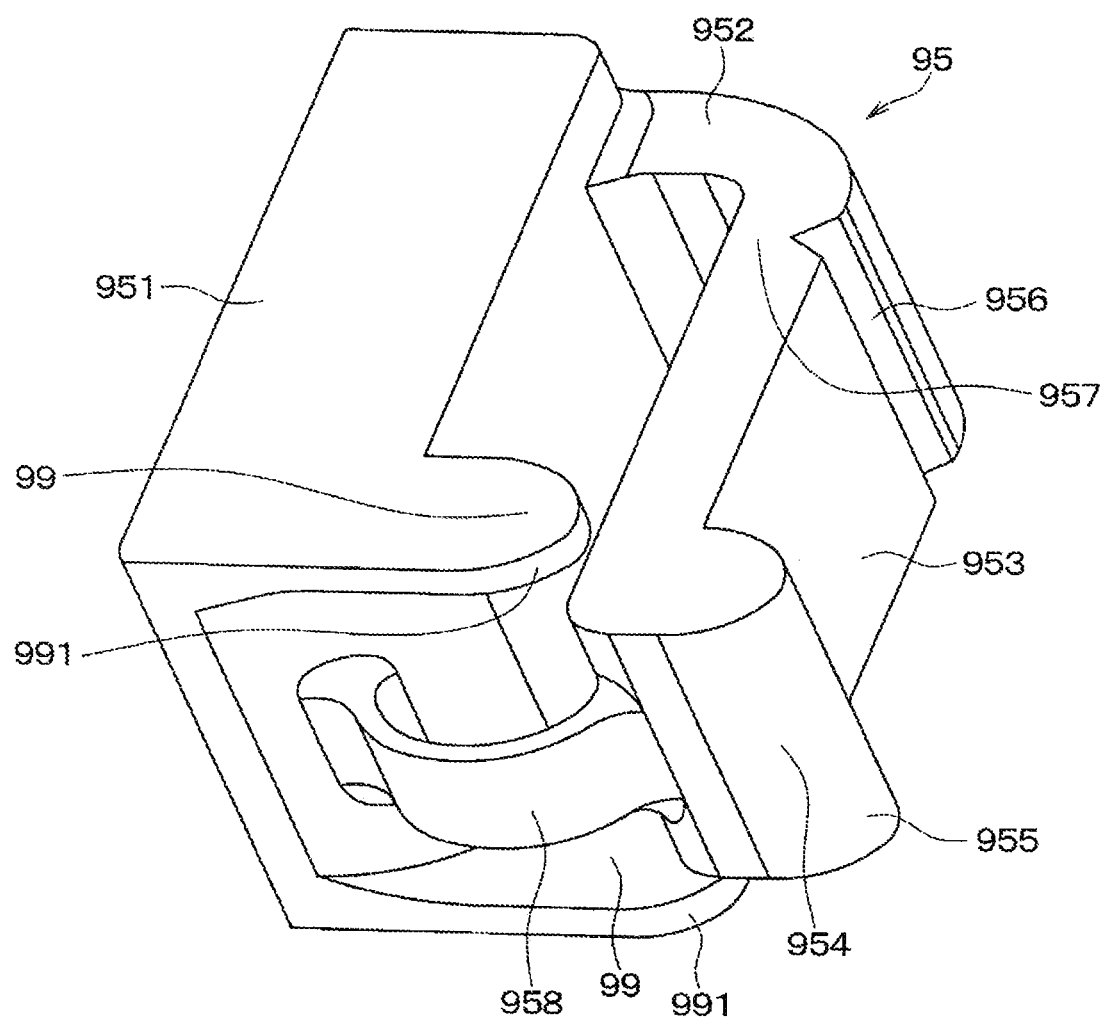
FIG. 22 is a perspective view of a deformation member of the vehicle brake device.

Here, as illustrated in FIGS. 21 and 22, the stopper 99 is disposed on/in the deformation member 95. Here, the stopper 99 is integrated with the deformation member 95. In this case, the stopper 99 is connected to the base 951 of the deformation member 95 and protrudes from the base 951 towards the lever front surface 813, here from the base 951 rearward. Similarly to the above, the stopper surface 991 of the stopper 99 faces the lever front surface 813 and is not in contact with the lever front surface 813 in the initial state. A distance in the front-rear direction from the stopper surface 991 to the lever front surface 813 in the initial state is longer than a distance in the front-rear direction from the contact surface 955 to the lever front surface 813 in the initial state. The stopper surface 991 has a shape of a side surface of a semicircular column, and is curved convexly toward the lever front surface 813. Here, the stopper 99 is integrated with the deformation member 95, but may be separated from the deformation member 95.

In the fifth embodiment, effects similar to the effects of the fourth embodiment are obtained.

Sixth Embodiment

Figure 23:
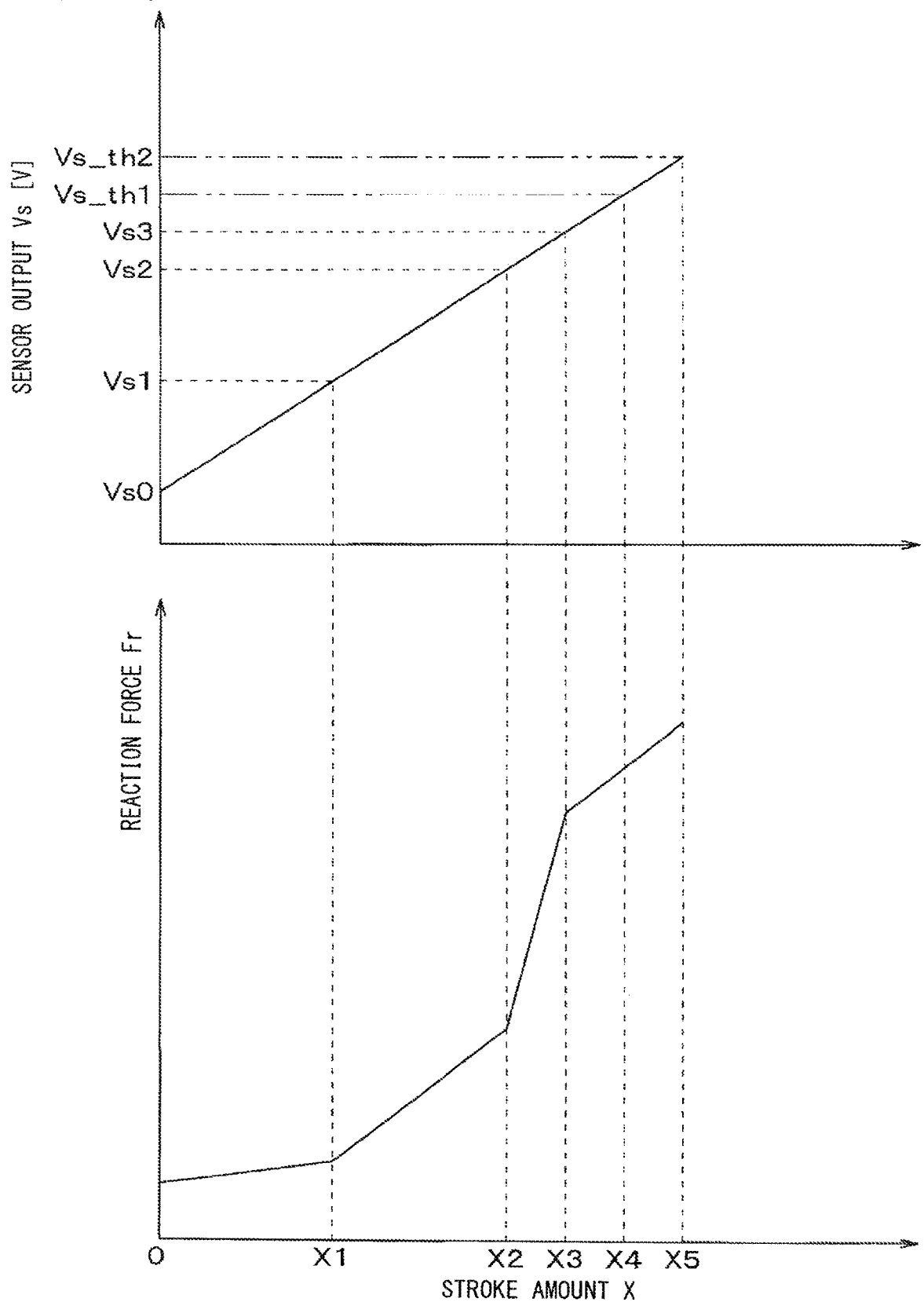
FIG. 23 is a chart illustrating a relationship between a stroke amount, a reaction force, and a sensor output in a vehicle brake device according to a sixth embodiment.

In a sixth embodiment, as in the first embodiment, when the stroke amount X is greater than X2 and less than X3, the deformation portion 953 is elastically deformed by the force transmitted from the lever 812 to the deformation portion 953. Here, the deformation member 95 includes, for example, a brittle material. In the sixth embodiment, as illustrated in FIG. 23, when the stroke amount X is X3, the deformation portion 953 is damaged by the force transmitted from the lever 812 to the deformation portion 953. Since the deformation portion 953 is damaged, here, the easily deformable portion 957 is broken when the stroke amount X is greater than X3 and less than X5, the reaction force Fr by the deformation portion 953 is not generated. At this time, the reaction force Fr to the lever 812 is generated by the restoring force of the first elastic member 91 and the second elastic member 92. Here, when the stroke amount X is X4 greater than X3 and less than X5, here, when the deformation portion 953 is damaged, the sensor output Vs is the first sensor predetermined value Vs_th1.

In the sixth embodiment, effects similar to the effects of the first embodiment are obtained.

Seventh Embodiment

Figure 24:
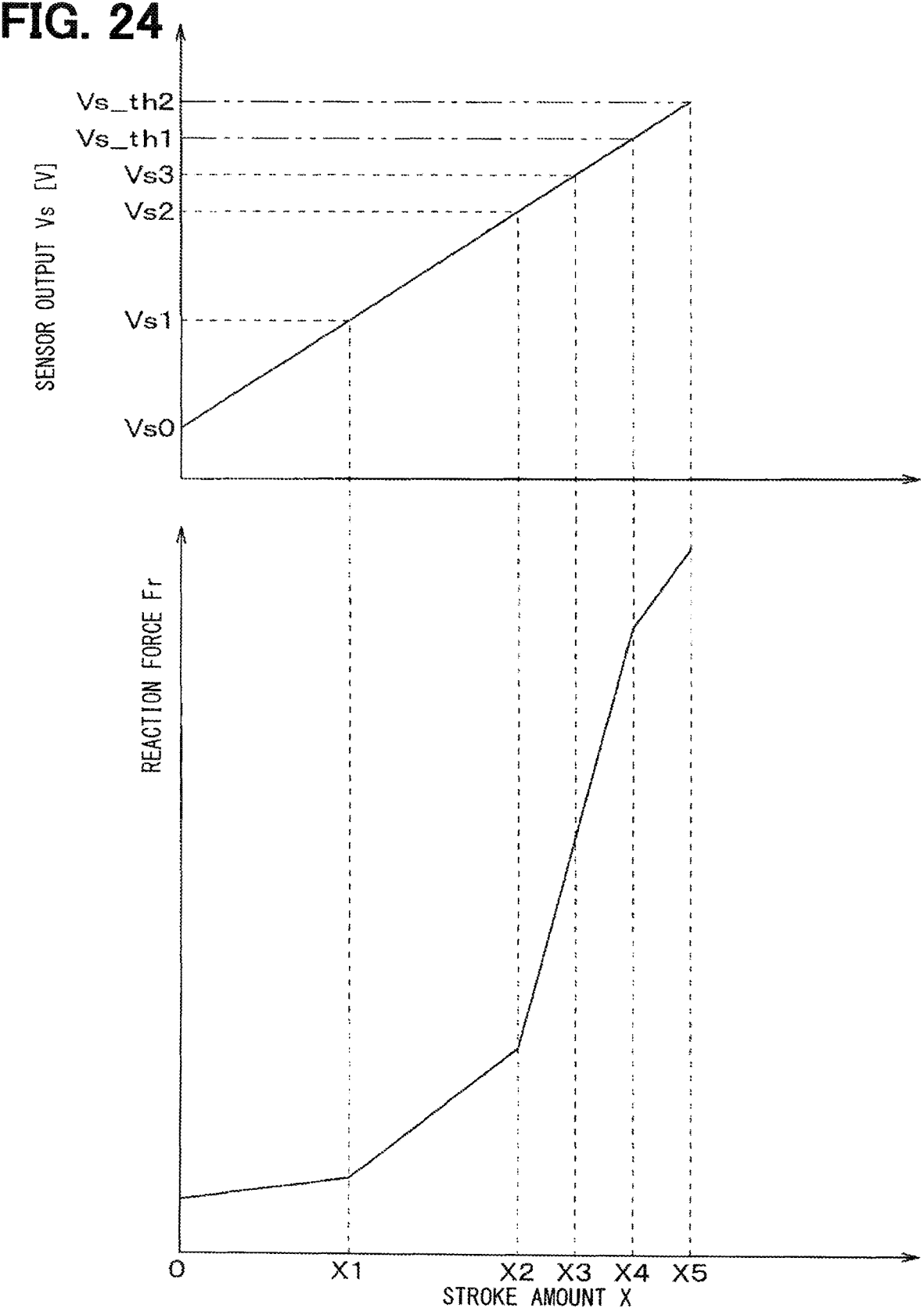
FIG. 24 is a chart illustrating a relationship between a stroke amount, a reaction force, and a sensor output in a vehicle brake device according to a seventh embodiment.

In a seventh embodiment, as illustrated in FIG. 24, when the stroke amount X is greater than X2 and less than X4, the deformation portion 953 is elastically deformed by the force transmitted from the lever 812 to the deformation portion 953. When the stroke amount X is X4, the force transmitted from the lever 812 to the deformation portion 953 causes the deformation portion 953 to yield, that is, starts to be plastically deformed. When the stroke amount X is greater than or equal to X4 and less than X5, the deformation of the deformation portion 953 is deflection accompanied by plastic deformation, and thus the deformation portion 953 generates the reaction force Fr to the lever 812 by the force of reaction to the force received from the lever 812. Therefore, at this time, the reaction force Fr to the lever 812 is generated by the restoring force of the first elastic member 91, the restoring force of the second elastic member 92, and the force of reaction of the deformation portion 953 to the force received by the deformation portion 953 from the lever 812. Here, when the stroke amount X is X4 and when the deformation portion 953 is damaged, the sensor output Vs is the first sensor predetermined value Vs_th1.

In the seventh embodiment, effects similar to the effects of the first embodiment are obtained.

Eighth Embodiment

In an eighth embodiment, as in the first embodiment, the deformation portion 953 is deformed with respect to the stroke amount X, and thus the reaction force Fr and the sensor output Vs change with respect to the stroke amount X. Specifically, when the stroke amount X is X3, the force transmitted from the lever 812 to the deformation portion 953 causes the deformation portion 953 to yield, that is, starts to be plastically deformed. At this time, the reaction force Fr to the lever 812 is generated by the restoring force of the first elastic member 91, the restoring force of the second elastic member 92, and the force of reaction of the deformation portion 953 to the force received by the deformation portion 953 from the lever 812. When the stroke amount X is X4, the deformation portion 953 is damaged by the force transmitted from the lever 812 to the deformation portion 953. When the stroke amount X is X5, the lever 812 and the stopper 99 come into contact with each other to stop the forward rotation of the lever 812.

Figure 25:
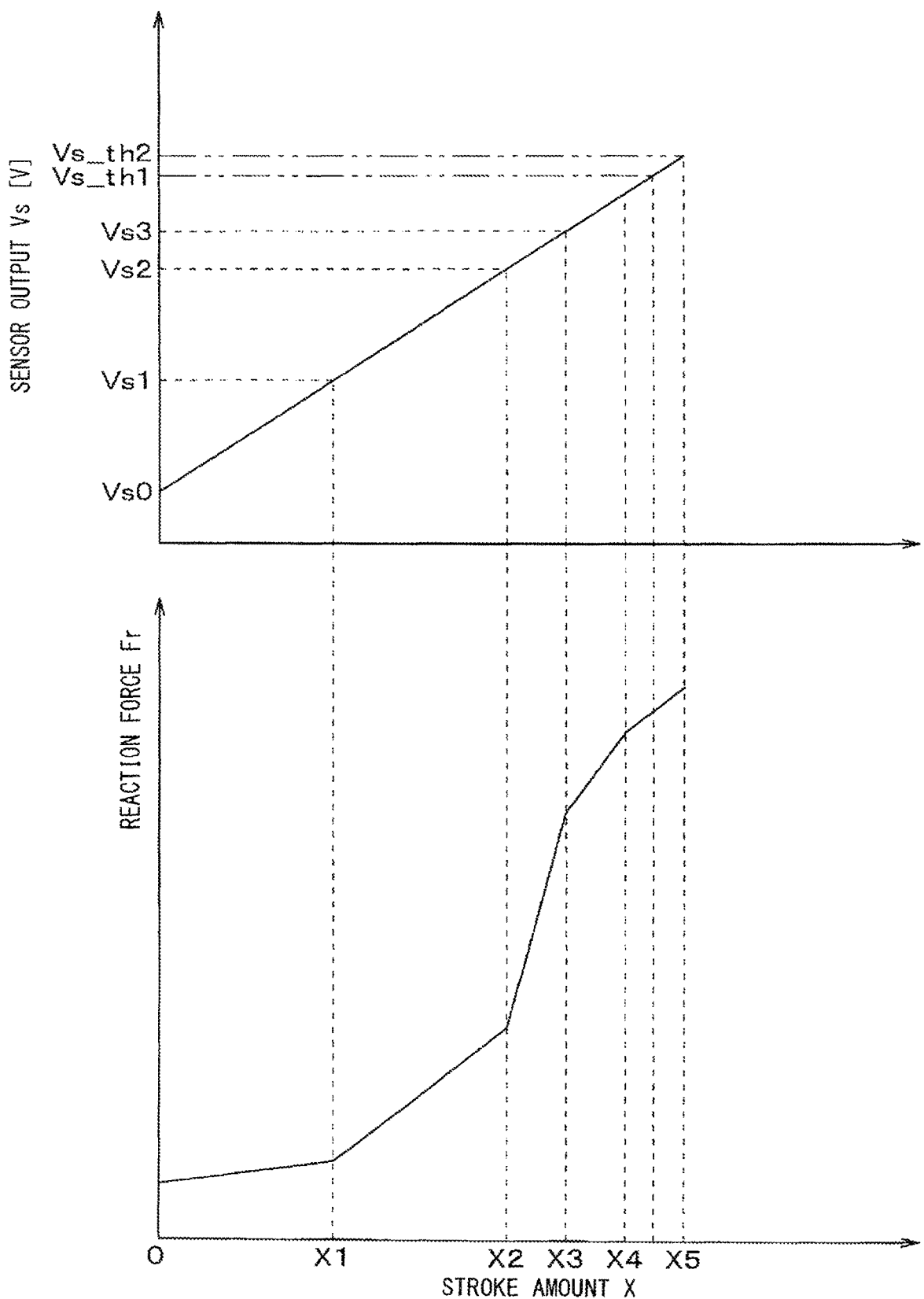
FIG. 25 is a chart illustrating a relationship between a stroke amount, a reaction force, and a sensor output in a vehicle brake device according to an eighth embodiment.

In the eighth embodiment, as illustrated in FIG. 25, when the stroke amount X is greater than X4 and less than X5, here, when the deformation portion 953 is damaged, the sensor output Vs is the first sensor predetermined value Vs_th1.

In the eighth embodiment, effects similar to the effects of the first embodiment are obtained. As in the eighth embodiment, the sensor output Vs when the stroke amount X is greater than X4 and less than X5 may be the first sensor predetermined value Vs_th1.

Ninth Embodiment

In a ninth embodiment, as in the first embodiment, the deformation portion 953 is deformed with respect to the stroke amount X, and thus the reaction force Fr and the sensor output Vs change with respect to the stroke amount X.

Figure 26:
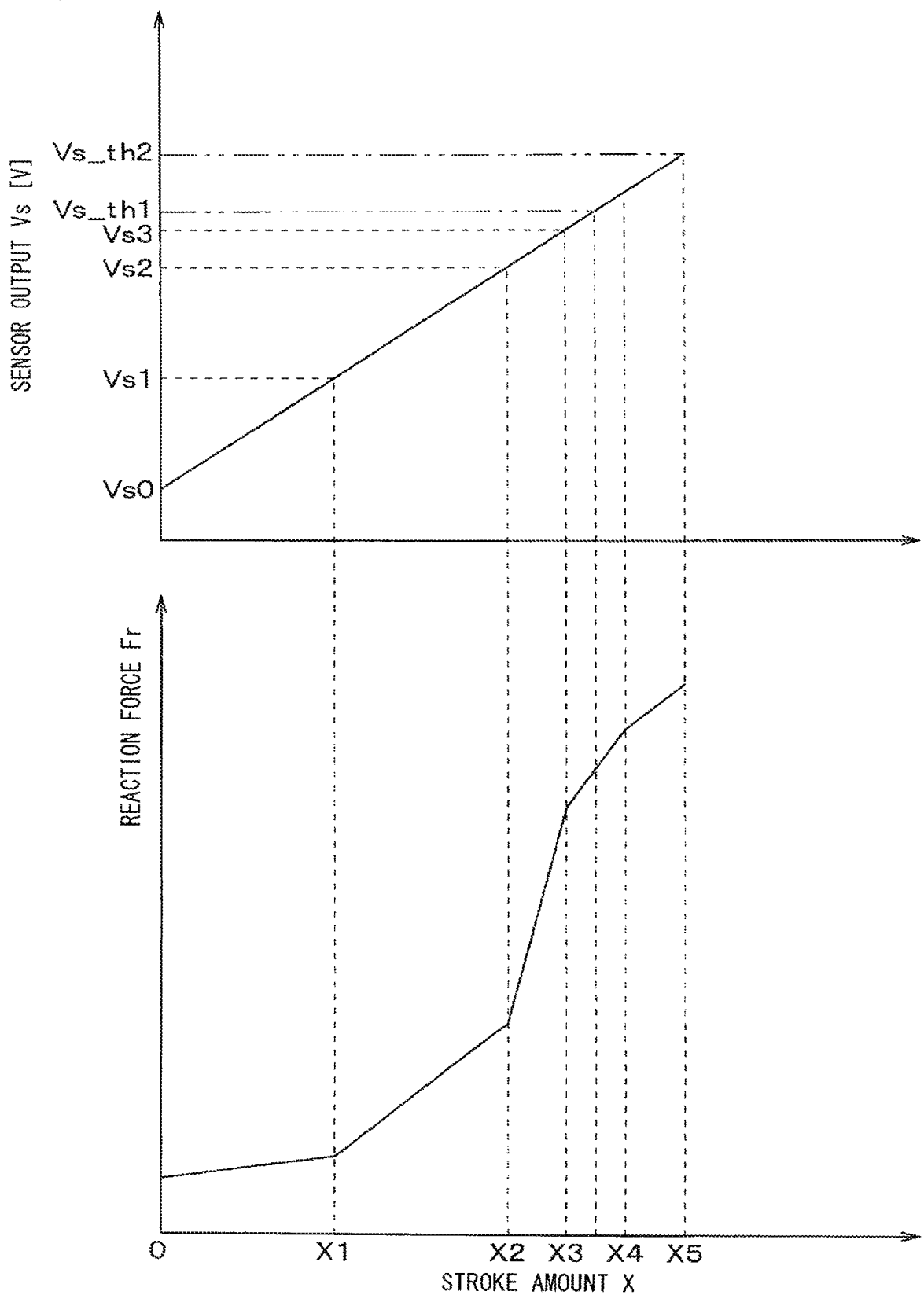
FIG. 26 is a chart illustrating a relationship between a stroke amount, a reaction force, and a sensor output in a vehicle brake device according to a ninth embodiment.

In the ninth embodiment, as illustrated in FIG. 26, when the stroke amount X is greater than or equal to X3 and less than X4, here, when the deformation portion 953 is plastically deformed, the sensor output Vs is the first sensor predetermined value Vs_th1.

In the ninth embodiment, effects similar to the effects of the first embodiment are obtained. As in the ninth embodiment, the sensor output Vs when the stroke amount X is greater than or equal to X3 less than X4 and less than X4 may be the first sensor predetermined value Vs_th1.

Tenth Embodiment

In a tenth embodiment, as in the first embodiment, the deformation portion 953 is deformed with respect to the stroke amount X, and thus the reaction force Fr and the sensor output Vs change with respect to the stroke amount X.

Figure 27:
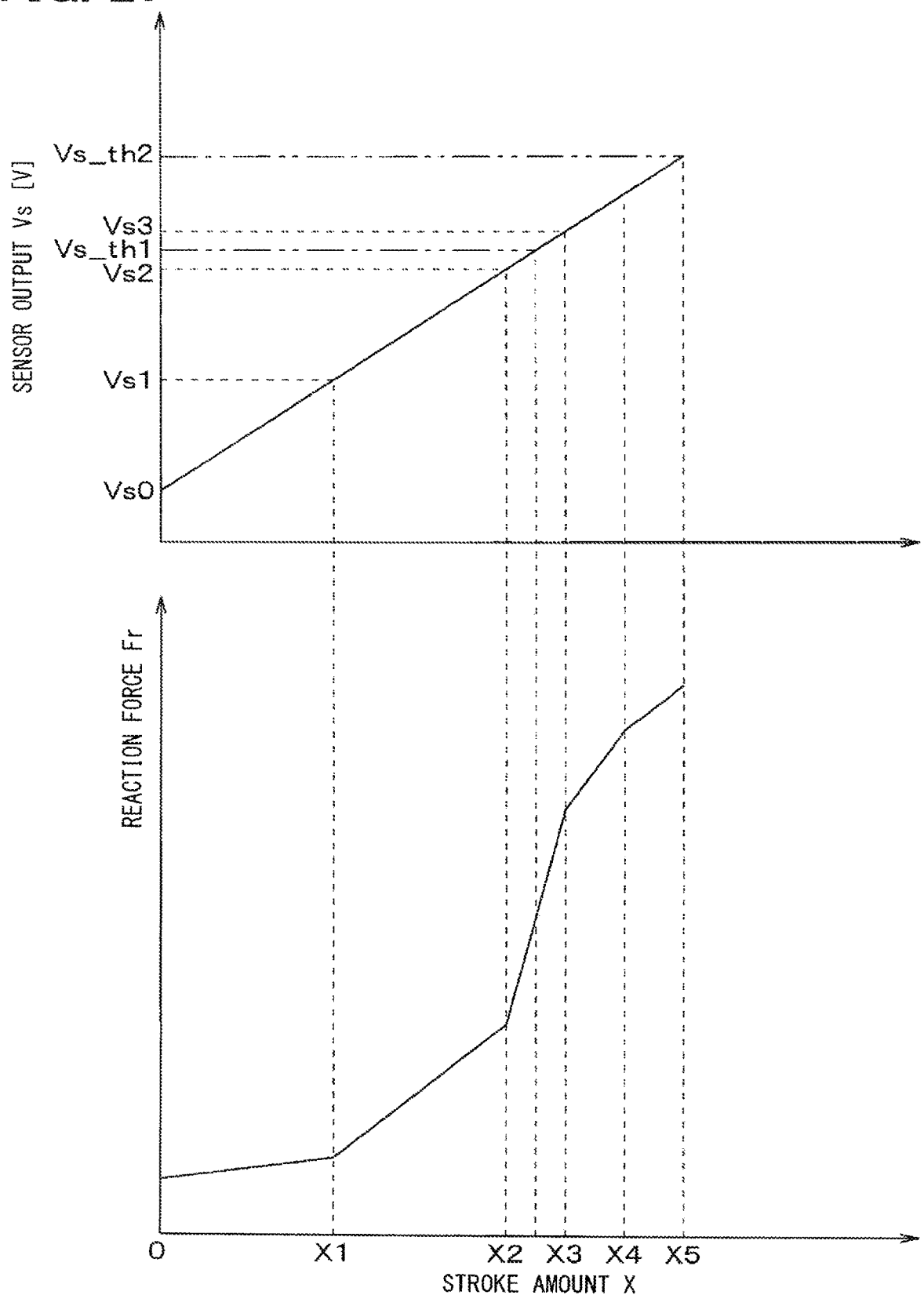
FIG. 27 is a chart illustrating a relationship between a stroke amount, a reaction force, and a sensor output in a vehicle brake device according to a tenth embodiment.

In the tenth embodiment, as illustrated in FIG. 27, the sensor output Vs when the stroke amount X is greater than X2 and less than X3, here, when the deformation portion 953 is elastically deformed is the first sensor predetermined value Vs_th1.

In the tenth embodiment, effects similar to effects of the first embodiment are obtained. As in the tenth embodiment, the sensor output Vs when the stroke amount X is greater than X2 and less than X3 may be the first sensor predetermined value Vs_th1.

Other Embodiments

The present disclosure is not limited to the above embodiments, and can be appropriately modified from the above embodiments. For example, the embodiments may be appropriately combined. In each of the embodiments, it goes without saying that the elements constituting the embodiments are not necessarily essential except for a case where it is explicitly stated that the elements are particularly essential and a case where the elements are considered to be obviously essential in principle.

A control unit and the like and a method thereof described in the present disclosure may be achieved by a dedicated computer provided by configuring a processor and a memory programmed to execute one or a plurality of functions embodied by a computer program. Alternatively, the control unit and the like and the method thereof described in the present disclosure may be achieved by a dedicated computer provided by configuring a processor with one or more dedicated hardware logic circuits. Alternatively, the control unit and the like and the method thereof described in the present disclosure may be achieved by one or more dedicated computers configured by a combination of a processor and a memory programmed to execute one or more functions and a processor configured by one or more hardware logic circuits. The computer program may be stored in a computer-readable non-transitory tangible recording medium as an instruction executed by a computer.

(1) In the embodiments, the vehicle brake device 80 includes the stroke sensor 86. The number of stroke sensors 86 is not limited to one, and may be two or more.

(2) In the embodiments, the first elastic member 91 and the second elastic member 92 are compression coil springs. However, the first elastic member 91 and the second elastic member 92 are not limited to the compression coil springs. The deformation member 95 and the stopper 99 are disposed on the front side of the housing cylindrical portion 884. However, the first elastic member 91, the second elastic member 92, the deformation member 95, and the stopper 99 are not limited to being disposed on the front side of the housing cylindrical portion 884.

Figure 28:
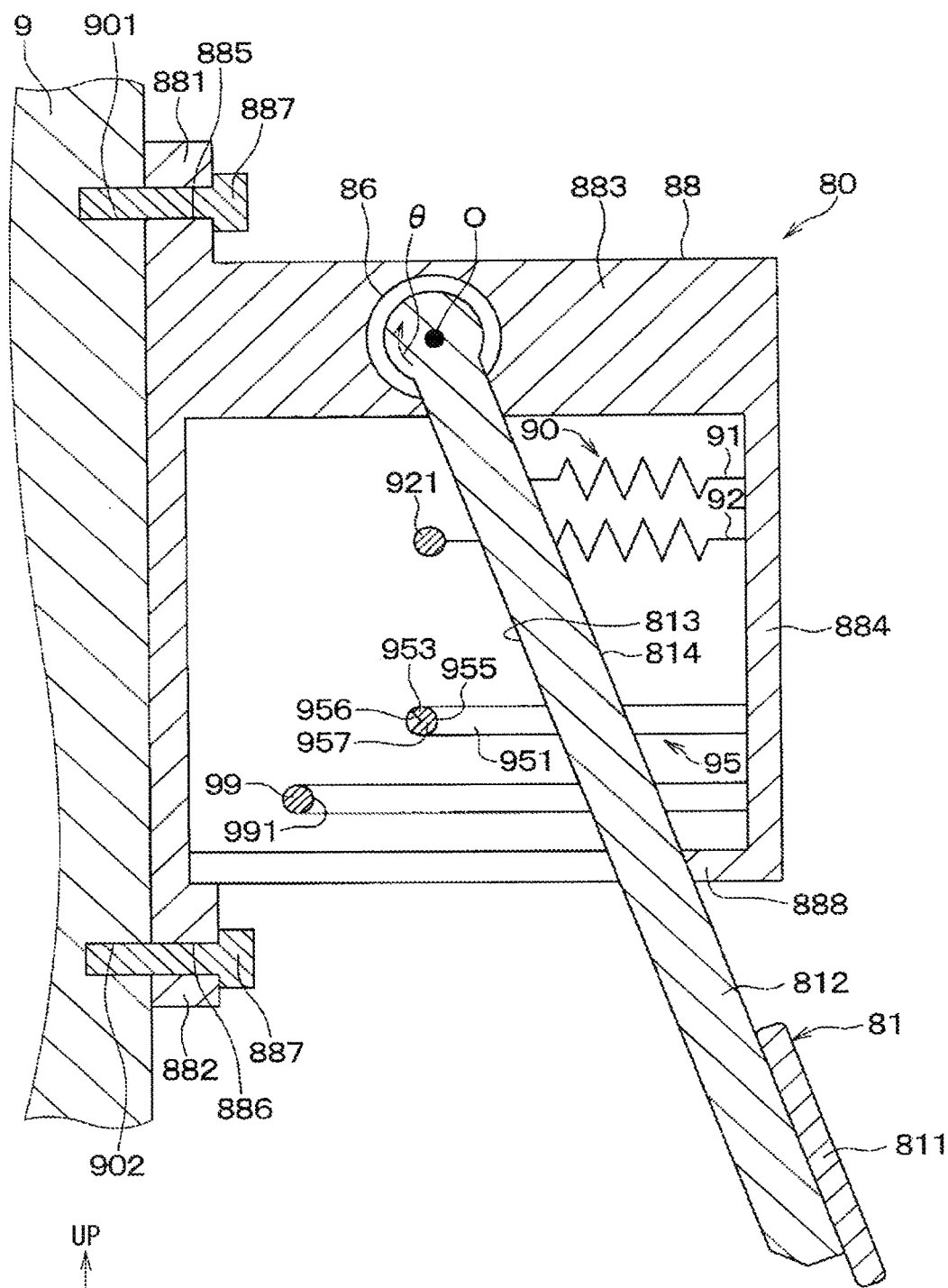
FIG. 28 is a sectional view of a vehicle brake device according to another embodiment.

For example, as illustrated in FIG. 28, the first elastic member 91 may be a tension spring and may be connected to the rear side of the housing cylindrical portion 884 and the lever rear surface 814. The second elastic member 92 may be a tension spring. In this case, the one end of the second elastic member 92 is connected to the rear side of the housing cylindrical portion 884. The other end of the second elastic member 92 is connected to a second elastic member contact 921. The second elastic member contact 921 is fixed to the housing cylindrical portion 884. When the brake pedal 81 is operated, the second elastic member contact 921 comes into contact with the lever front surface 813. As a result, the second elastic member contact 921 receives a force from the lever 812. Since the second elastic member 92 is pulled by the force received by the second elastic member contact 921, a restoring force of the second elastic member 92 is generated. The deformation member 95 has a U shape. The base 951 of the deformation member 95 is connected to the rear side of the housing cylindrical portion 884 and extends in the front-rear direction. The deformation portion 953 of the deformation member 95 is connected to the base 951 here and extends in a left-right direction with respect to the front side of the vehicle 6. The recess 956 of the deformation portion 953 is formed opposite to the contact surface 955 of the deformation portion 953. The recess 956 forms the easily deformable portion 957. The stopper 99 has a U shape and is connected to the rear side of the housing cylindrical portion 884. In such a configuration, effects similar to the effects of the first embodiment are obtained. This configuration and the first embodiment may be combined.

(3) In the embodiments, the reaction force generator 90 includes one first elastic member 91 and one second elastic member 92. However, the number of first elastic members 91 is not limited to one, and may be plural. The number of second elastic members 92 is not limited to one, and may be plural. The reaction force generator 90 may include a damper. The damper includes, for example, a viscous fluid such as oil and air. The reaction force Fr corresponding to a stroke change amount ΔX, which is an amount of change in the stroke amount X per unit time, is generated by the viscous fluid.

(4) In the embodiments, the recess 956 is a V-shaped groove. However, the recess 956 is not limited to the V-shaped groove, and may be, for example, a U-shaped groove, a step, or the like.

(5) In the embodiments, as the stroke amount X increases, the sensor output Vs of the stroke sensor 86 increases. However, as the stroke amount X increases, the sensor output Vs of the stroke sensor 86 is not limited to increase. For example, as the stroke amount X increases, the sensor output Vs of the stroke sensor 86 may decrease.

In this case, when the deformation portion 953 is deformed, for example, in the first embodiment, when the stroke amount X is greater than or equal to X4, the stroke sensor 86 outputs the sensor output Vs that is less than or equal to the first sensor predetermined value Vs_th1 to the ECU 53.

Here, when the stroke amount X is X5 greater than X4, the lever 812 and the stopper 99 come into contact with each other to stop the forward rotation of the lever 812. At this time, since the sensor output Vs of the stroke sensor 86 decreases as the stroke amount X increases, the sensor output Vs when the stroke amount X is X5 is less than the sensor output Vs when the stroke amount X is X4. Therefore, in this case, the second sensor predetermined value Vs_th2, which is the sensor output Vs when the stroke amount X is X5, is less than the first sensor predetermined value Vs_th1, which is the sensor output Vs when the stroke amount X is X4.

In this case, when the sensor output Vs is greater than the first sensor predetermined value Vs_th1, the operation of the brake pedal 81 is normal. Thus, the ECU 53 performs the normal control in step S120. When the sensor output Vs is less than or equal to the first sensor predetermined value Vs_th1, the operation of the brake pedal 81 is abnormal. Thus, the ECU 53 performs the stop control in step S130. In this way, the safety of the vehicle 6 is ensured.

What is claimed is:

1. A brake device for a vehicle comprising:
a brake pedal including a pedal and a lever that rotates about a rotation axis when the pedal is operated;
a housing that rotatably supports the lever;
a reaction force generator configured to generate a reaction force to the lever in accordance with a stroke amount of the brake pedal by receiving a force from the lever when the brake pedal is operated;
a deformation member including a deformation portion configured to be deformed by a force received from the lever when the brake pedal is operated in a state where the reaction force generated by the reaction force generator is generated;
a stroke sensor configured to output a signal corresponding to the stroke amount; and
a determiner configured to determine that an operation of the brake pedal is abnormal, wherein
the determiner determines that the operation of the brake pedal is abnormal when the signal output from the stroke sensor is greater than or equal to a predetermined value.

2. The brake device according to claim 1, wherein
the deformation portion is configured to be damaged by the force received from the lever when the brake pedal is operated, and
when the deformation portion is damaged, the determiner determines that the operation of the brake pedal is abnormal.

3. The brake device according to claim 1, wherein
the deformation portion is configured to be plastically deformed by the force received from the lever when the brake pedal is operated, and
when the deformation portion is plastically deformed, the determiner determines that the operation of the brake pedal is abnormal.

4. The brake device according to claim 1, wherein
the deformation portion is configured to be elastically deformed by the force received from the lever when the brake pedal is operated, and
when the deformation portion is elastically deformed, the determiner determines that the operation of the brake pedal is abnormal.

5. The brake device according to claim 1, further comprising a stopper configured to come into contact with the lever and stop rotation of the lever when the stroke amount is greater than the stroke amount when the deformation portion is deformed.

6. The brake device according to claim 5, wherein the stopper is disposed on the housing.

7. The brake device according to claim 5, wherein the stopper is disposed on the deformation member.

8. The brake device according to claim 1, wherein the deformation member is disposed on the housing.

9. The brake device according to claim 1, wherein
the deformation portion includes a contact surface that comes into contact with the lever when the brake pedal is operated, and
the contact surface is curved convexly toward the lever.

10. The brake device according to claim 1, wherein
the determiner determines that the operation of the brake pedal is abnormal when the signal corresponding to the stroke amount is greater than or equal to a predetermined value corresponding to the stroke amount when the deformation portion is deformed.

11. The brake device according to claim 1, wherein
the determiner includes a processor and a memory,
the processor is configured to determine that the operation of the brake pedal is abnormal when the signal output from the stroke sensor is greater than or equal to a predetermined value, and
the processor is configured to output a signal indicating that operation of the brake pedal is abnormal and instruct execution of control for stopping the vehicle when it is determined that the operation of the brake pedal is abnormal.

* * * * *